(12) United States Patent
Hu et al.

(10) Patent No.: US 12,256,360 B2
(45) Date of Patent: Mar. 18, 2025

(54) METHOD, APPARATUS, AND SYSTEM FOR WIRELESS PROXIMITY DETECTION

(71) Applicants: Yuqian Hu, Greenbelt, MD (US); Guozhen Zhu, Greenbelt, MD (US); Beibei Wang, Clarksville, MD (US); K. J. Ray Liu, Potomac, MD (US); Oscar Chi-Lim Au, Rockville, MD (US)

(72) Inventors: Yuqian Hu, Greenbelt, MD (US); Guozhen Zhu, Greenbelt, MD (US); Beibei Wang, Clarksville, MD (US); K. J. Ray Liu, Potomac, MD (US); Oscar Chi-Lim Au, Rockville, MD (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 0 days.

(21) Appl. No.: 18/379,622

(22) Filed: Oct. 12, 2023

(65) Prior Publication Data
US 2024/0064691 A1    Feb. 22, 2024

Related U.S. Application Data

(63) Continuation-in-part of application No. PCT/US2022/045708, filed on Oct. 4, 2022, and a continuation-in-part of application No. 17/827,902, filed on May 30, 2022, and a continuation-in-part of application No. 17/838,228, filed on Jun. 12, 2022, and a continuation-in-part of application No.
(Continued)

(51) Int. Cl.
*H04W 64/00* (2009.01)
*G01S 11/06* (2006.01)

(52) U.S. Cl.
CPC ............ *H04W 64/003* (2013.01); *G01S 11/06* (2013.01)

(58) Field of Classification Search
CPC ......... G01S 11/06; G01S 13/003; G01S 7/006; H04W 64/003; H04W 8/005
See application file for complete search history.

(56) References Cited

FOREIGN PATENT DOCUMENTS

| CN | 108123765 | * | 6/2018 | ............. G08B 21/22 |
| CN | 110852266 | * | 2/2020 | ............ G06V 40/103 |

OTHER PUBLICATIONS

Wang et al., "Gait Recognition Using WiFi Signals", Sep. 12, 2016, ACM, pp. 363-373 (Year: 2016).*

* cited by examiner

*Primary Examiner* — Zhiyu Lu

(57) ABSTRACT

Methods, apparatus and systems for wireless sensing and proximity detection are described. For example, a described method comprises: transmitting, by a first wireless device, a wireless signal through a wireless multipath channel in a venue; receiving, by a second wireless device, the wireless signal through the wireless multipath channel, wherein the received wireless signal differs from the transmitted wireless signal due to the wireless multipath channel and a movement of an object in the venue; obtaining a time series of channel information (TSCI) of the wireless multipath channel based on the received wireless signal; computing a first motion statistics based on a time-domain correlation of channel information (CI) in the TSCI; computing a second motion statistics based on a frequency-domain correlation of the CI in the TSCI; and detecting a proximity of the object to a target in the venue based on the first motion statistics and the second motion statistics.

30 Claims, 10 Drawing Sheets

Related U.S. Application Data

17/838,231, filed on Jun. 12, 2022, and a continuation-in-part of application No. 17/838,244, filed on Jun. 12, 2022, and a continuation-in-part of application No. 17/891,037, filed on Aug. 18, 2022, now Pat. No. 12,078,510, and a continuation-in-part of application No. 17/945,995, filed on Sep. 15, 2022, now Pat. No. 12,004,838, and a continuation-in-part of application No. 16/790,610, filed on Feb. 13, 2020, now Pat. No. 11,928,894, and a continuation-in-part of application No. 16/871,004, filed on May 10, 2020, now Pat. No. 12,046,040, and a continuation-in-part of application No. 16/909,913, filed on Jun. 23, 2020, now abandoned, and a continuation-in-part of application No. 17/019,270, filed on Sep. 13, 2020, now Pat. No. 12,036,948, and a continuation-in-part of application No. 17/149,625, filed on Jan. 14, 2021, and a continuation-in-part of application No. 17/180,766, filed on Feb. 20, 2021, now Pat. No. 11,953,618, and a continuation-in-part of application No. 17/352,185, filed on Jun. 18, 2021, now Pat. No. 11,906,659, and a continuation-in-part of application No. 17/352,306, filed on Jun. 20, 2021, now Pat. No. 11,940,550, and a continuation-in-part of application No. 17/537,432, filed on Nov. 29, 2021, and a continuation-in-part of application No. 17/539,058, filed on Nov. 30, 2021, now Pat. No. 12,066,572, and a continuation-in-part of application No. 17/959,487, filed on Oct. 4, 2022, and a continuation-in-part of application No. 17/960,080, filed on Oct. 4, 2022, and a continuation-in-part of application No. 18/108,563, filed on Feb. 10, 2023, and a continuation-in-part of application No. 18/144,321, filed on May 8, 2023, now Pat. No. 12,153,156, and a continuation-in-part of application No. 18/199,963, filed on May 21, 2023, and a continuation-in-part of application No. 18/211,567, filed on Jun. 19, 2023, now Pat. No. 12,044,790.

(60) Provisional application No. 63/543,717, filed on Oct. 11, 2023.

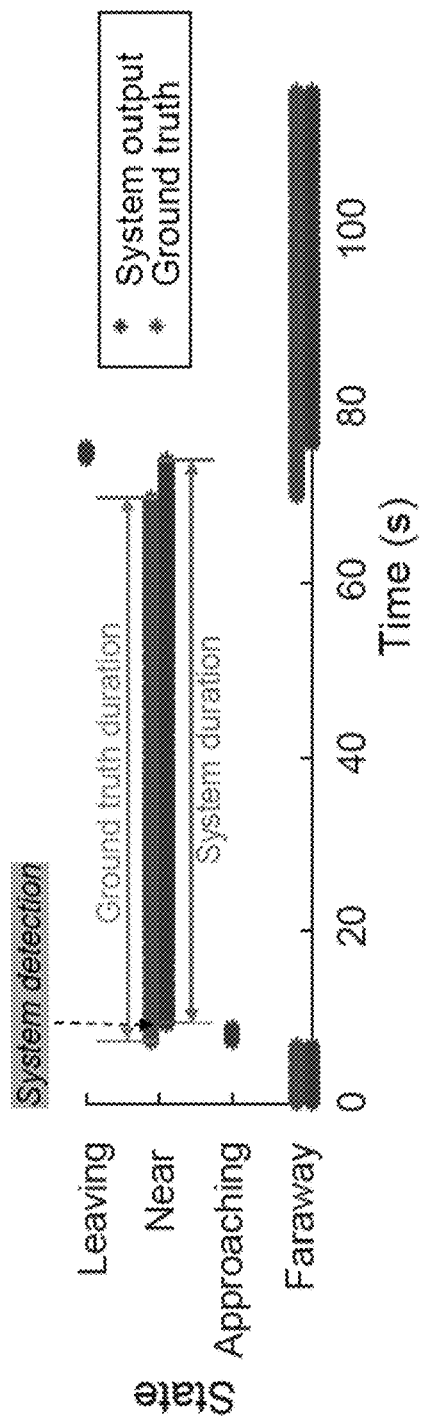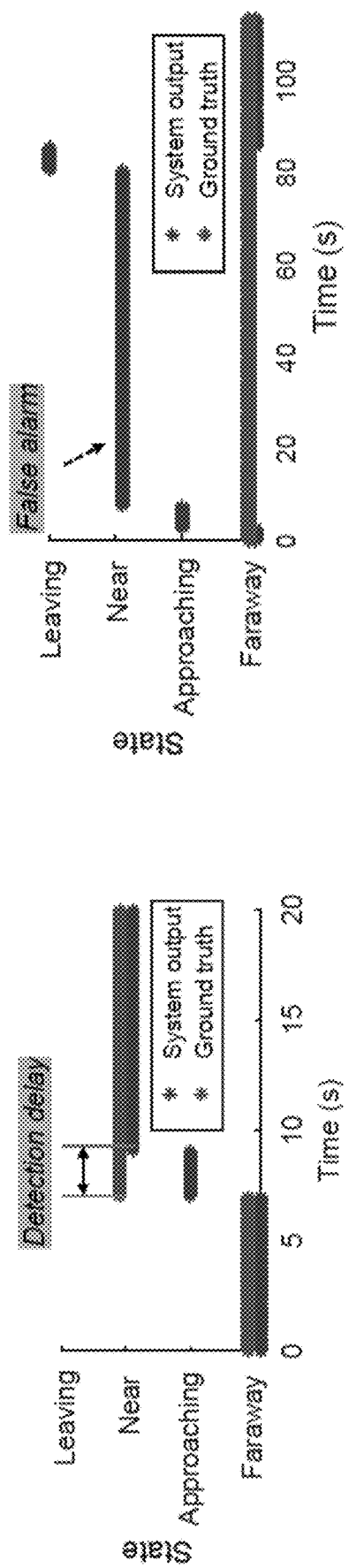
FIG. 7A
FIG. 7B
FIG. 7C

METHOD, APPARATUS, AND SYSTEM FOR WIRELESS PROXIMITY DETECTION

CROSS-REFERENCE TO RELATED APPLICATIONS

The present application hereby incorporates by reference the entirety of the disclosures of, and claims priority to, each of the following cases:
  (a) U.S. Provisional Patent application 63/543,717, entitled "METHODS, APPARATUS, AND SYSTEMS FOR WIRELESS PROXIMITY DETECTION, MOTION RECOGNITION AND HUMAN IDENTIFICATION", filed on Oct. 11, 2023,
  (b) U.S. patent application Ser. No. 16/790,610, entitled "METHOD, APPARATUS, AND SYSTEM FOR WIRELESS GAIT RECOGNITION", filed Feb. 13, 2020,
  (c) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020,
  (d) U.S. patent application Ser. No. 16/909,913, entitled "METHOD, APPARATUS, AND SYSTEM FOR IMPROVING TOPOLOGY OF WIRELESS SENSING SYSTEMS", filed on Jun. 23, 2020,
  (e) U.S. patent application Ser. No. 17/019,270, entitled "METHOD, APPARATUS, AND SYSTEM FOR VEHICLE WIRELESS MONITORING", filed on Sep. 13, 2020,
  (f) U.S. patent application Ser. No. 17/149,625, entitled "METHOD, APPARATUS, AND SYSTEM FOR WIRELESS MONITORING WITH MOTION LOCALIZATION", filed on Jan. 14, 2021,
  (g) U.S. patent application Ser. No. 17/180,766, entitled "METHOD, APPARATUS, AND SYSTEM FOR WIRELESS MOTION RECOGNITION", filed on Feb. 20, 2021,
  (h) U.S. patent application Ser. No. 17/352,185, entitled "METHOD, APPARATUS, AND SYSTEM FOR WIRELESS MICRO MOTION MONITORING", filed on Jun. 18, 2021,
  (i) U.S. patent application Ser. No. 17/352,306, entitled "METHOD, APPARATUS, AND SYSTEM FOR WIRELESS MONITORING TO ENSURE SECURITY", filed on Jun. 20, 2021,
  (j) U.S. patent application Ser. No. 17/537,432, entitled "METHOD, APPARATUS, AND SYSTEM FOR AUTOMATIC AND ADAPTIVE WIRELESS MONITORING AND TRACKING", filed on Nov. 29, 2021,
  (k) U.S. patent application Ser. No. 17/539,058, entitled "METHOD, APPARATUS, AND SYSTEM FOR HUMAN IDENTIFICATION BASED ON HUMAN RADIO BIOMETRIC INFORMATION", filed on Nov. 30, 2021,
  (l) U.S. patent application Ser. No. 17/827,902, entitled "METHOD, APPARATUS, AND SYSTEM FOR SPEECH ENHANCEMENT AND SEPARATION BASED ON AUDIO AND RADIO SIGNALS", filed on May 30, 2022,
  (m) U.S. patent application Ser. No. 17/838,228, entitled "METHOD, APPARATUS, AND SYSTEM FOR WIRELESS SENSING BASED ON CHANNEL INFORMATION", filed on Jun. 12, 2022,
  (n) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022,
  (o) U.S. patent application Ser. No. 17/838,244, entitled "METHOD, APPARATUS, AND SYSTEM FOR WIRELESS SENSING BASED ON LINKWISE MOTION STATISTICS", filed on Jun. 12, 2022,
  (p) U.S. patent application Ser. No. 17/891,037, entitled "METHOD, APPARATUS, AND SYSTEM FOR MAP RECONSTRUCTION BASED ON WIRELESS TRACKING", filed on Aug. 18, 2022,
  (q) U.S. patent application Ser. No. 17/945,995, entitled "METHOD, APPARATUS, AND SYSTEM FOR WIRELESS VITAL MONITORING USING HIGH FREQUENCY SIGNALS", filed on Sep. 15, 2022,
  (r) U.S. patent application Ser. No. 17/959,487, entitled "METHOD, APPARATUS, AND SYSTEM FOR VOICE ACTIVITY DETECTION BASED ON RADIO SIGNALS", filed on Oct. 4, 2022,
  (s) U.S. patent application Ser. No. 17/960,080, entitled "METHOD, APPARATUS, AND SYSTEM FOR ENHANCED WIRELESS MONITORING OF VITAL SIGNS", filed on Oct. 4, 2022,
  (t) PCT Patent application PCT/US22/45708, entitled "METHOD, APPARATUS, AND SYSTEM FOR WIRELESS SENSING MEASUREMENT AND REPORTING", filed on Oct. 4, 2022,
  (u) U.S. patent application Ser. No. 18/108,563, entitled "METHOD, APPARATUS, AND SYSTEM FOR WIRELESS SENSING BASED ON MULTIPLE GROUPS OF WIRELESS DEVICES", filed on Feb. 10, 2023,
  (v) U.S. patent application Ser. No. 18/144,321, entitled "METHOD, APPARATUS, AND SYSTEM FOR WIRELESS MONITORING WITH IMPROVED ACCURACY", filed on May 8, 2023,
  (w) U.S. patent application Ser. No. 18/199,963, entitled "METHOD, APPARATUS, AND SYSTEM FOR WIRELESS SENSING MEASUREMENT AND REPORTING", filed on May 21, 2023,
  (x) U.S. patent application Ser. No. 18/211,567, entitled "METHOD, APPARATUS, AND SYSTEM FOR CORRELATION-BASED WIRELESS MONITORING AND LOCALIZATION", filed on Jun. 19, 2023.

TECHNICAL FIELD

The present teaching generally relates to wireless sensing. More specifically, the present teaching relates to wireless sensing and proximity detection of an object with respect to a target in a venue.

BACKGROUND

The demand for human proximity detection has grown significantly across diverse indoor applications. Human proximity detection refers to an ability to identify and monitor the presence and proximity of individuals in relation to specific areas, objects, or systems. This technology plays a crucial role in home automation, indoor localization, security, and efficiency enhancement in various contexts. While popular vision-based technologies like cameras, infrared, and radar are commonly used for human motion detection and localization, they can be privacy-invasive or require specialized sensors for accurate measurements. In cases where additional sensors are unavailable or privacy preservation is a concern, alternative solutions are needed.

As the popularity of Internet of Things (IoT) devices has surged, the widespread use of WiFi connectivity in these devices has led to the realization that wireless sensing will play a major role in IoT applications. By utilizing WiFi radio interactions during signal propagation, wireless devices can passively detect human movements and activities through the analysis of wireless signals. This approach makes passive indoor proximity detection more realistic and feasible. Instead of relying on invasive vision-based technologies, analyzing the wireless signal propagation allows for non-intrusive detection of human presence and movements. This advancement in WiFi-based proximity detection enables a more privacy-friendly and accessible solution for practical use.

However, implementing a robust proximity detector through on-device WiFi signals is not a straightforward task. The ability of WiFi signals to penetrate walls and other obstacles helps with whole-home coverage, but it hinders proximity detection. Some studies utilize WiFi signals for motion detection, primarily focusing on motion detection within a wide coverage area, and overlooking the specific aspect of proximity detection. Other works concentrate on localization, but often require complex setups involving multiple transceivers with specific geometric arrangements or dedicated calibration and training for precise localization. Such complexities are unnecessary for proximity detection.

SUMMARY

The present teaching relates wireless sensing and proximity detection of an object with respect to a target in a venue.

In one embodiment, a system for wireless sensing is described. The system comprises: a first wireless device, a second wireless device, and a processor. The first wireless device is configured to transmit a wireless signal through a wireless multipath channel in a venue. The second wireless device is configured to receive the wireless signal through the wireless multipath channel. The received wireless signal differs from the transmitted wireless signal due to the wireless multipath channel and a movement of an object in the venue. The processor is configured for: obtaining a time series of channel information (TSCI) of the wireless multipath channel based on the received wireless signal; computing a first motion statistics based on a time-domain correlation of channel information (CI) in the TSCI; computing a second motion statistics based on a frequency-domain correlation of the CI in the TSCI; and detecting a proximity of the object to a target in the venue based on the first motion statistics and the second motion statistics.

In another embodiment, a method for wireless sensing is described. The method comprises: transmitting, by a first wireless device, a wireless signal through a wireless multipath channel in a venue; receiving, by a second wireless device, the wireless signal through the wireless multipath channel, wherein the received wireless signal differs from the transmitted wireless signal due to the wireless multipath channel and a movement of an object in the venue; obtaining a time series of channel information (TSCI) of the wireless multipath channel based on the received wireless signal; computing a first motion statistics based on a time-domain correlation of channel information (CI) in the TSCI; computing a second motion statistics based on a frequency-domain correlation of the CI in the TSCI; and detecting a proximity of the object to a target in the venue based on the first motion statistics and the second motion statistics.

In yet another embodiment, an apparatus for wireless sensing is described. The apparatus comprises: a receiver configured to receive a wireless signal transmitted by a transmitter through a wireless multipath channel in a venue, a memory having a set of instructions stored therein, and a processor communicatively coupled to the memory and the receiver. The received wireless signal differs from the transmitted wireless signal due to the wireless multipath channel and a movement of an object in the venue. The processor is configured for: obtaining a time series of channel information (TSCI) of the wireless multipath channel based on the received wireless signal; computing a first motion statistics based on a time-domain correlation of channel information (CI) in the TSCI; computing a second motion statistics based on a frequency-domain correlation of the CI in the TSCI; and detecting a proximity of the object to a target in the venue based on the first motion statistics and the second motion statistics.

Other concepts relate to software for implementing the present teaching on wireless sensing and proximity detection in a venue. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

FIGS. 7A-7C show exemplary evaluation metrics for wireless proximity detection, according to some embodiments of the present disclosure.

DETAILED DESCRIPTION

Figure 1:
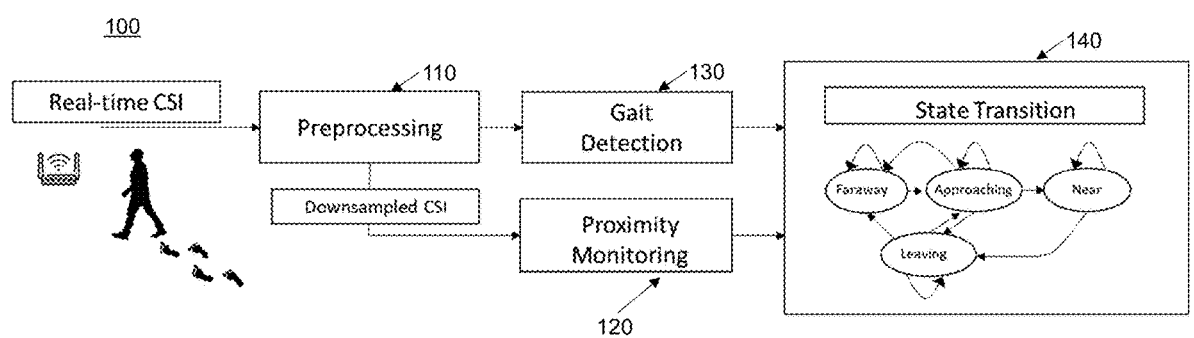
FIG. 1 shows a diagram of an exemplary system for proximity detection, according to some embodiments of the present disclosure.

The symbol "I" disclosed herein means "and/or". For example, "A/B" means "A and/or B." In some embodiments, a method/device/system/software of a wireless monitoring system is disclosed. A time series of channel information (CI) of a wireless multipath channel is obtained using a processor, a memory communicatively coupled with processor and a set of instructions stored in memory. The time series of CI (TSCI) may be extracted from a wireless (sounding) signal transmitted from a Type1 heterogeneous wireless device (e.g. wireless transmitter (TX), "Bot" device) to a Type2 heterogeneous wireless device (e.g. wireless receiver (RX), "Origin" device) in a venue through the channel. The channel is impacted by an expression/motion of an object in venue. A characteristics/spatial-temporal information (STI)/motion information (MI) of object/expression/motion may be computed/monitored based on the TSCI. A task (e.g. sensing goal) may be performed based on the characteristics/STI/MI. A task-related presentation may be generated in a user-interface (UI) on a device of a user. The characteristics/STI/MI may be motion indicator value (MIV)/activity data (AD)/motion data (MD)/motion sensing data (MSD)/motion detection data (MDD)/motion score (MS)/motion statistics (MS2).

Expression may comprise placement, placement of moveable parts, location/speed/acceleration/position/orientation/direction/identifiable place/region/presence/spatial coordinate, static expression/presentation/state/size/length/width/height/angle/scale/curve/surface/area/volume/pose/posture/manifestation/body language, dynamic expression/motion/sequence/movement/activity/behavior/gesture/gait/extension/contraction/distortion/deformation, body expression (e.g. head/face/eye/mouth/tongue/hair/voice/neck/limbs/arm/hand/leg/foot/muscle/moveable parts), surface expression/shape/texture/material/color/electromagnetic (EM) characteristics/visual pattern/wetness/reflectance/translucency/flexibility, material property (e.g. living tissue/hair/fabric/metal/wood/leather/plastic/artificial material/solid/liquid/gas/temperature), expression change, and/or some combination.

Wireless multipath channel may comprise: communication channel, analog frequency channel (e.g. with carrier frequency near 700/800/900 MHz, or 1.8/1.9/2.4/3/5/6/27/60/70+ GHz), coded channel (e.g. in CDMA), and/or channel of wireless/cellular network/system (e.g. WLAN, WiFi, mesh, 4G/LTE/5G/6G/7G/8G/9G/10G, Bluetooth, Zigbee, UWB, RFID, microwave). It may comprise multiple channels, which may be consecutive (e.g. adjacent/overlapping bands) or non-consecutive (e.g. non-overlapping bands, 2.4 GHz/5 GHz). While channel is used to transmit wireless signal and perform sensing measurements, data (e.g. TSCI/feature/component/characteristics/STI/MI/analytics/task outputs, auxiliary/non-sensing data/network traffic) may be communicated/transmitted in channel.

Wireless signal may comprise a series of probe signals. It may be any of: EM radiation, radio frequency (RF)/light/bandlimited/baseband signal, signal in licensed/unlicensed/ISM band, MIMO transmission, sensing transmission, wireless/mobile/cellular/optical communication/network/mesh/downlink/uplink/unicast/multicast/broadcast signal. It may be compliant to standard/protocol (e.g. WLAN, WWAN, WPAN, WBAN, international/national/industry/defacto, IEEE/802/802.11/15/16, WiFi, 802.11n/ac/ax/be/bf, 3G/4G/LTE/5G/6G/7G/8G/9G/10G, 3GPP/Bluetooth/BLE/Zigbee/NFC/RFID/UWB/WiMax). A probe signal may comprise any of: protocol/standard/beacon/pilot/sounding/excitation/illumination/handshake/synchronization/reference/source/motion probe/detection/sensing/management/control/data/null-data/beacon/pilot/request/response/association/reassociation/disassociation/authentication/action/report/poll/announcement/extension/enquiry/acknowledgement frame/packet/signal, and/or null-data-frame (NDP)/RTS/CTS/QoS/CF-Poll/CF-Ack/block acknowledgement/reference/training/synchronization. It may comprise line-of-sight (LOS)/non-LOS components (or paths/links). It may have data embedded. Probe signal may be replaced by (or embedded in) data signal. Each frame/packet/signal may comprise: preamble/header/payload. It may comprise: training sequence, short (STF)/long (LTF) training field, L-STF/L-LTF/L-SIG/HE-STF/HE-LTF/HE-SIG-A/HE-SIG-B, channel estimation field (CEF). It may be used to transfer power wirelessly from Type1 device to Type2 device. Sounding rate of signal may be adjusted to control amount of transferred power. Probe signals may be sent in burst.

TSCI may be extracted/obtained (e.g. by IC/chip) from wireless signal at a layer of Type2 device (e.g. layer of OSI reference model, PHY/MAC/data link/logical link control/network/transport/session/presentation/application layer, TCP/IP/internet/link layer). It may be extracted from received wireless/derived signal. It may comprise wireless sensing measurements obtained in communication protocol (e.g. wireless/cellular communication standard/network, 4G/LTE/5G/6G/7G/8G/9G/10G, WiFi, IEEE 802.11/11bf/15/16). Each CI may be extracted from a probe/sounding signal, and may be associated with time stamp. TSCI may be associated with starting/stopping time/duration/amount of CI/sampling/sounding frequency/period. A motion detection/sensing signal may be recognized/identified base on probe signal. TSCI may be stored/retrieved/accessed/preprocessed/processed/postprocessed/conditioned/analyzed/monitored. TSCI/features/components/characteristics/STI/MI/analytics/task outcome may be communicated to edge/cloud server/Type1/Type2/hub/data aggregator/another device/system/network.

Type1/Type2 device may comprise components (hardware/software) such as electronics/chip/integrated circuit (IC)/RF circuitry/antenna/modem/TX/RX/transceiver/RF interface (e.g. 2.4/5/6/27/60/70+ GHz radio/front/back haul radio)/network/interface/processor/memory/module/circuit/board/software/firmware/connectors/structure/enclosure/housing/structure. It may comprise access point (AP)/base-station/mesh/router/repeater/hub/wireless station/client/terminal/"Origin Satellite"/"Tracker Bot", and/or internet-of-things (IoT)/appliance/wearable/accessory/peripheral/furniture/amenity/gadget/vehicle/module/wireless-enabled/unicast/multicast/broadcasting/node/hub/target/sensor/portable/mobile/cellular/communication/motion-detection/source/destination/standard-compliant device. It may comprise additional attributes such as auxiliary functionality/network connectivity/purpose/brand/model/appearance/form/shape/color/material/specification. It may be heterogeneous because the above (e.g. components/device types/additional attributes) may be different for different Type1 (or Type2) devices.

Type1/Type2 devices may/may not be authenticated/associated/collocated. They may be same device. Type1/

Type2/portable/nearby/another device, sensing/measurement session/link between them, and/or object/expression/motion/characteristics/STI/MI/task may be associated with an identity/identification/identifier (ID) such as UUID, associated/unassociated STA ID (ASID/USID/AID/UID). Type2 device may passively observe/monitor/receive wireless signal from Type1 device without establishing connection (e.g. association/authentication/handshake) with, or requesting service from, Type1 device. Type1/Type2 device may move with object/another object to be tracked.

Type1 (TX) device may function as Type2 (RX) device temporarily/sporadically/continuously/repeatedly/interchangeably/alternately/simultaneously/contemporaneously/concurrently; and vice versa. Type1 device may be Type2 device. A device may function as Type1/Type2 device temporarily/sporadically/continuously/repeatedly/simultaneously/concurrently/contemporaneously. There may be multiple wireless nodes each being Type1/Type2 device. TSCI may be obtained between two nodes when they exchange/communicate wireless signals. Characteristics/STI/MI of object may be monitored individually based on a TSCI, or jointly based on multiple TSCI.

Motion/expression of object may be monitored actively with Type1/Type2 device moving with object (e.g. wearable devices/automated guided vehicle/AGV), or passively with Type1/Type2 devices not moving with object (e.g. both fixed devices).

Task may be performed with/without reference to reference/trained/initial database/profile/baseline that is trained/collected/processed/computed/transmitted/stored in training phase. Database may be re-training/updated/reset.

Presentation may comprise UI/GUI/text/message/form/webpage/visual/image/video/graphics/animation/graphical/symbol/emoticon/sign/color/shade/sound/music/speech/audio/mechanical/gesture/vibration/haptics presentation. Time series of characteristic/STI/MI/task outcome/another quantity may be displayed/presented in presentation. Any computation may be performed/shared by processor (or logic unit/chip/IC)/Type1/Type2/user/nearby/another device/local/edge/cloud server/hub/data/signal analysis subsystem/sensing initiator/response/SBP initiator/responder/AP/non-AP. Presentation may comprise any of: monthly/weekly/daily/simplified/detailed/cross-sectional/small/large/form-factor/color-coded/comparative/summary/web view, animation/voice announcement/another presentation related to periodic/repetition characteristics of repeating motion/expression.

Multiple Type1 (or Type 2) devices may interact with a Type2 (or Type1) device. The multiple Type1 (or Type2) devices may be synchronized/asynchronous, and/or may use same/different channels/sensing parameters/settings (e.g. sounding frequency/bandwidth/antennas). Type2 device may receive another signal from Type1/another Type1 device. Type1 device may transmit another signal to Type2/another Type2 device. Wireless signals sent (or received) by them may be sporadic/temporary/continuous/repeated/synchronous/simultaneous/concurrent/contemporaneous. They may operate independently/collaboratively. Their data (e.g. TSCI/feature/characteristics/STI/MI/intermediate task outcomes) may be processed/monitored/analyzed independently or jointly/collaboratively.

Any devices may operate based on some state/internal state/system state. Devices may communicate directly, or via another/nearby/portable device/server/hub device/cloud server. Devices/system may be associated with one or more users, with associated settings. Settings may be chosen/selected/pre-programmed/changed/adjusted/modified/varied over time. The method may be performed/executed in shown order/another order. Steps may be performed in parallel/iterated/repeated. Users may comprise human/adult/older adult/man/woman/juvenile/child/baby/pet/animal/creature/machine/computer module/software. Step/operation/processing may be different for different devices (e.g. based on locations/orientation/direction/roles/user-related characteristics/settings/configurations/available resources/bandwidth/power/network connection/hardware/software/processor/co-processor/memory/battery life/antennas/directional antenna/power setting/device parameters/characteristics/conditions/status/state). Any/all device may be controlled/coordinated by a processor (e.g. associated with Type1/Type2/nearby/portable/another device/server/designated source). Some device may be physically in/of/attached to a common device.

Type1 (or Type2) device may be capable of wirelessly coupling with multiple Type2 (or Type1) devices. Type1 (or Type2) device may be caused/controlled to switch/establish wireless coupling (e.g. association/authentication) from Type2 (or Type1) device to another Type2 (or another Type1) device. The switching may be controlled by server/hub device/processor/Type1 device/Type2 device. Radio channel may be different before/after switching. A second wireless signal may be transmitted between Type1 (or Type2) device and second Type2 (or second Type1) device through the second channel. A second TSCI of second channel may be extracted/obtained from second signal. The first/second signals, first/second channels, first/second Type1 device, and/or first/second Type2 device may be same/similar/co-located.

Type1 device may transmit/broadcast wireless signal to multiple Type2 devices, with/without establishing connection (association/authentication) with individual Type2 devices. It may transmit to a particular/common MAC address, which may be MAC address of some device (e.g. dummy receiver). Each Type2 device may adjust to particular MAC address to receive wireless signal. Particular MAC address may be associated with venue, which may be recorded in an association table of an Association Server (e.g. hub device). Venue may be identified by Type1 device/Type2 device based on wireless signal received at particular MAC address.

For example, Type2 device may be moved to a new venue. Type1 device may be newly set up in venue such that Type1 and Type2 devices are not aware of each other. During set up, Type1 device may be instructed/guided/caused/controlled (e.g. by dummy receiver, hardware pin setting/connection, stored setting, local setting, remote setting, downloaded setting, hub device, and/or server) to send wireless signal (e.g. series of probe signals) to particular MAC address. Upon power up, Type2 device may scan for probe signals according to a table of MAC addresses (e.g. stored in designated source, server, hub device, cloud server) that may be used for broadcasting at different locations (e.g. different MAC address used for different venue such as house/office/enclosure/floor/multi-storey building/store/airport/mall/stadium/hall/station/subway/lot/area/zone/region/district/city/country/continent). When Type2 device detects wireless signal sent to particular MAC address, it can use the table to identify venue.

Channel may be selected from a set of candidate/selectable/admissible channels. Candidate channels may be associated with different frequency bands/bandwidth/carrier frequency/modulation/wireless standards/coding/encryption/payload characteristics/network/ID/SSID/characteristics/settings/parameters. Particular MAC address/selected channel may be changed/adjusted/varied/modified over time (e.g. according to time table/rule/policy/mode/condition/situation/change). Selection/change may be based on availability/collision/traffic pattern/co-channel/inter-channel interference/effective bandwidth/random selection/pre-selected list/plan. It may be done by a server (e.g. hub device). They may be communicated (e.g. from/to Type1/Type2/hub/another device/local/edge/cloud server).

Wireless connection (e.g. association/authentication) between Type1 device and nearby/portable/another device may be established (e.g. using signal handshake). Type1 device may send first handshake signal (e.g. sounding frame/probe signal/request-to-send RTS) to the nearby/portable/another device. Nearby/portable/another device may reply to first signal by sending second handshake signal (e.g. command/clear-to-send/CTS) to Type1 device, triggering Type1 device to transmit/broadcast wireless signal to multiple Type2 devices without establishing connection with the Type2 devices. Second handshake signals may be response/acknowledge (e.g. ACK) to first handshake signal. Second handshake signal may contain information of venue/Type1 device. Nearby/portable/another device may be a dummy device with purpose (e.g. primary purpose, secondary purpose) to establish wireless connection with Type1 device, to receive first signal, or send second signal. Nearby/portable/another device may be physically attached to Type1 device.

In another example, nearby/portable/another device may send third handshake signal to Type1 device triggering Type1 device to broadcast signal to multiple Type2 devices without establishing connection with them. Type1 device may reply to third signal by transmitting fourth handshake signal to the another device.

Nearby/portable/another device may be used to trigger multiple Type1 devices to broadcast. It may have multiple RF circuitries to trigger multiple transmitters in parallel. Triggering may be sequential/partially sequential/partially/fully parallel. Parallel triggering may be achieved using additional device (s) to perform similar triggering in parallel to nearby/portable/another device. After establishing connection with Type1 device, nearby/portable/another device may suspend/stop communication with Type1 device. It may enter an inactive/hibernation/sleep/stand-by/low-power/OFF/power-down mode. Suspended communication may be resumed. Nearby/portable/another device may have the particular MAC address and Type1 device may send signal to particular MAC address.

The (first) wireless signal may be transmitted by a first antenna of Type1 device to some first Type2 device through a first channel in a first venue. A second wireless signal may be transmitted by a second antenna of Type1 device to some second Type2 device through a second channel in a second venue. First/second signals may be transmitted at first/second (sounding) rates respectively, perhaps to first/second MAC addresses respectively. Some first/second channels/signals/rates/MAC addresses/antennas/Type2 devices may be same/different/synchronous/asynchronous. First/second venues may have same/different sizes/shape/multipath characteristics. First/second venues/immediate areas around first/second antennas may overlap. First/second channels/signals may be WiFi+LTE (one being WiFi, one being LTE), or WiFi+WiFi, or WiFi (2.4 GHz)+WiFi (5 GHz), or WiFi (5 GHz, channel=a1, BW=a2)+WiFi (5 GHz/channel=b1, BW=b2). Some first/second items (e g channels/signals/rates/MAC addresses/antennas/Type1/Type2 devices) may be changed/adjusted/varied/modified over time (e.g. based on time table/rule/policy/mode/condition/situation/another change).

Each Type1 device may be signal source of multiple Type2 devices (i.e. it sends respective probe signal to respective Type2 device). Each respective Type2 device may choose asynchronously the Type1 device from among all Type1 devices as its signal source. TSCI may be obtained by each respective Type2 device from respective series of probe signals from Type1 device. Type2 device may choose Type1 device from among all Type1 devices as its signal source (e.g. initially) based on identity/identification/identifier of Type1/Type2 device, task, past signal sources, history, characteristics, signal strength/quality, threshold for switching signal source, and/or information of user/account/profile/access info/parameters/input/requirement/criteria.

Database of available/candidate Type1 (or Type2) devices may be initialized/maintained/updated by Type2 (or Type1) device. Type2 device may receive wireless signals from multiple candidate Type1 devices. It may choose its Type1 device (i.e. signal source) based on any of: signal quality/strength/regularity/channel/traffic/characteristics/properties/states/task requirements/training task outcome/MAC addresses/identity/identifier/past signal source/history/user instruction/another consideration.

An undesirable/bad/poor/problematic/unsatisfactory/unacceptable/intolerable/faulty/demanding/undesirable/inadequate/lacking/inferiodunsuitable condition may occur when (1) timing between adjacent probe signals in received wireless signal becomes irregular, deviating from agreed sounding rate (e.g. time perturbation beyond acceptable range), and/or (2) processed/signal strength of received signal is too weak (e.g. below third threshold, or below fourth threshold for significant percentage of time), wherein processing comprises any lowpass/bandpass/highpass/median/moving/weighted average/linear/nonlinear/smoothing filtering. Any thresholds/percentages/parameters may be time-varying. Such condition may occur when Type1/Type2 device become progressively far away, or when channel becomes congested.

Some settings (e.g. Type1-Type2 device pairing/signal source/network/association/probe signal/sounding rate/scheme/channel/bandwidth/system state/TSCI/TSMA/task/task parameters) may be changed/varied/adjusted/modified. Change may be according to time table/rule/policy/mode/condition (e.g. undesirable condition)/another change. For example, sounding rate may normally be 100 Hz, but changed to 1000 Hz in demanding situations, and to 1 Hz in low power/standby situation.

Settings may change based on task requirement (e.g. 100 Hz normally and 1000 Hz momentarily for 20 seconds). In task, instantaneous system may be associated adaptively/dynamically to classes/states/conditions (e.g. low/normal/high priority/emergency/critical/regular/privileged/non-subscription/subscription/paying/non-paying). Settings (e.g. sounding rate) may be adjusted accordingly. Change may be controlled by: server/hub/Type1/Type2 device. Scheduled changes may be made according to time table. Changes may be immediate when emergency is detected, or gradual when developing condition is detected.

Characteristics/STI/MI may be monitored/analyzed individually based on a TSCI associated with a particular Type1/Type2 device pair, or jointly based on multiple TSCI associated multiple Type1/Type2 pairs, or jointly based on any TSCI associated with the particular Type2 device and any Type1 devices, or jointly based on any TSCI associated with the particular Type1 device and any Type2 devices, or globally based on any TSCI associated with any Type1/Type2 devices.

A classifier/classification/recognition/detection/estimation/projection/feature extraction/processing/filtering may be applied (e.g. to CI/CI-feature/characteristics/STI/MI), and/or trained/re-trained/updated. In a training stage, training may be performed based on multiple training TSCI of some training wireless multipath channel, or characteristic/STI/MI computed from training TSCI, the training TSCI obtained from training wireless signals transmitted from training Type1 devices and received by training Type2 devices. Re-training/updating may be performed in an operating stage based on training TSCI/current TSCI. There may be multiple classes (e.g. groupings/categories/events/motions/expression/activities/objects/locations) associated with venue/regions/zones/location/environment/home/office/building/warehouse/facility object/expression/motion/movement/process/event/manufacturing/assembly-line/maintenance/repairing/navigation/object/emotional/mental/state/condition/stage/gesture/gait/action/motion/presence/movement/daily/activity/history/event.

Classifier may comprise linear/nonlinear/binary/multi-class/Bayes classifier/Fisher linear discriminant/logistic regression/Markov chain/Monte Carlo/deep/neural network/perceptron/self-organization maps/boosting/meta algorithm/decision tree/random forest/genetic programming/kernel learning/KNN/support vector machine (SVM).

Feature extraction/projection may comprise any of: subspace projection/principal component analysis (PCA)/independent component analysis (ICA)/vector quantization/singular value decomposition (SVD)/eigen-decomposition/eigenvalue/time/frequency/orthogonal/non-orthogonal decomposition, processing/preprocessing/postprocessing. Each CI may comprise multiple components (e.g. vector/combination of complex values). Each component may be preprocessed to give magnitude/phase or a function of such.

Feature may comprise: output of feature extraction/projection, amplitude/magnitude/phase/energy/power/strength/intensity, presence/absence/proximity/likelihood/histogram, time/period/duration/frequency/component/decomposition/projection/band, local/global/maximum (max)/minimum (min)/zero-crossing, repeating/periodic/typical/habitual/one-time/atypical/abrupt/mutually-exclusive/evolving/transient/changing/time/related/correlated feature/pattern/trend/profile/events/tendency/inclination/behavior, cause-and-effect/short-term/long-term/correlation/statistics/frequency/period/duration, motion/movement/location/map/coordinate/height/speed/acceleration/angle/rotation/size/volume, suspicious/dangerous/alarming event/warning/belief/proximity/collision, tracking/breathing/heartbeat/gait/action/event/statistical/hourly/daily/weekly/monthly/yearly parameters/statistics/analytics, well-being/health/disease/medical statistics/analytics, an early/instantaneous/contemporaneous/delayed indication/suggestion/sign/indicator/verifier/detection/symptom of a state/condition/situation/disease/biometric, baby/patient/machine/device/temperature/vehicle/parking lot/venue/lift/elevator/spatial/road/fluid flow/home/room/office/house/building/warehouse/storage/system/ventilation/fan/pipe/duct/people/human/car/boat/truck/airplane/drone/downtown/crowd/impulsive event/cyclo-stationary/environment/vibration/material/surface/3D/2D/local/global, and/or another measurable quantity/variable. Feature may comprise monotonic function of feature, or sliding aggregate of features in sliding window.

Training may comprise AI/machine/deep/supervised/unsupervised/discriminative training/auto-encoder/linear discriminant analysis/regression/clustering/tagging/labeling/Monte Carlo computation.

A current event/motion/expression/object in venue at current time may be classified by applying classifier to current TSCI/characteristics/STI/MI obtained from current wireless signal received by Type2 device in venue from Type1 devices in an operating stage. If there are multiple Type1/Type2 devices, some/all (or their locations/antenna locations) may be a permutation of corresponding training Type1/Type2 devices (or locations/antenna locations). Type1/Type2 device/signal/channel/venue/object/motion may be same/different from corresponding training entity. Classifier may be applied to sliding windows. Current TSCI/characteristics/STI/MI may be augmented by training TSCI/characteristics/STI/MI (or fragment/extract) to bootstrap classification/classifier.

A first section/segment (with first duration/starting/ending time) of a first TSCI (associated with first Type1-Type2 device pair) may be aligned (e.g. using dynamic time warping/DTW/matched filtering, perhaps based on some mismatch/distance/similarity score/cost, or correlation/auto-correlation/cross-correlation) with a second section/segment (with second duration/starting/ending time) of a second TSCI (associated with second Type1-Type2 device pair), with each CI in first section mapped to a CI in second section. First/second TSCI may be preprocessed. Some similarity score (component/item/link/segment-wise) may be computed. The similarity score may comprise any of: mismatch/distance/similarity score/cost. Component-wise similarity score may be computed between a component of first item (CI/feature/characteristics/STI/MI) of first section and corresponding component of corresponding mapped item (second item) of second section. Item-wise similarity score may be computed between first/second items (e.g. based on aggregate of corresponding component-wise similarity scores). An aggregate may comprise any of: sum/weighted sum, weighted average/robust/trimmed mean/arithmetic/geometric/harmonic mean, median/mode. Link-wise similarity score may be computed between first/second items associated with a link (TX-RX antenna pair) of first/second Type1-Type2 device pairs (e.g. based on aggregate of corresponding item-wise similarity scores). Segment-wise similarity score may be computed between first/second segments (e.g. based on aggregate of corresponding link-wise similarity scores). First/second segment may be sliding.

In DTW, a function of any of: first/second segment, first/second item, another first (or second) item of first (or second) segment, or corresponding timestamp/duration/difference/differential, may satisfy a constraint. Time difference between first/second items may be constrained (e.g. upper/lower bounded). First (or second) section may be entire first (or second) TSCI. First/second duration/starting/ending time may be same/different.

In one example, first/second Type1-Type2 device pairs may be same and first/second TSCI may be same/different. When different, first/second TSCI may comprise a pair of current/reference, current/current or reference/reference TSCI. For "current/reference", first TSCI may be current TSCI obtained in operating stage and second TSCI may be reference TSCI obtained in training stage. For "reference/reference", first/second TSCI may be two TSCI obtained during training stage (e.g. for two training events/states/classes). For "current/current", first/second TSCI may be two TSCI obtained during operating stage (e.g. associated with two different antennas, or two measurement setups). In another example, first/second Type1-Type2 device pairs may be different, but share a common device (Type1 or Type2).

Aligned first/second segments (or portion of each) may be represented as first/second vectors. Portion may comprise all items (for "segment-wise"), or all items associated with a TX-RX link (for "link-wise"), or an item (for "item-wise"), or a component of an item (for "component-wise"). Similarity score may comprise combination/aggregate/function of any of: inner product/correlation/autocorrelation/correlation indicator/covariance/discriminating score/distance/Euclidean/absolute/L_k/weighted distance (between first/second vectors). Similarity score may be normalized by vector length. A parameter derived from similarity score may be modeled with a statistical distribution. A scale/location/another parameter of the statistical distribution may be estimated.

Recall there may be multiple sliding segments. Classifier may be applied to a sliding first/second segment pair to obtain a tentative classification result. It may associate current event with a particular class based on one segment pair/tentative classification result, or multiple segment pairs/tentative classification results (e.g. associate if similarity scores prevail (e.g. being max/min/dominant/matchless/most significant/excel) or significant enough (e.g. higher/lower than some threshold) among all candidate classes for N consecutive times, or for a high/low enough percentage, or most/least often in a time period).

Channel information (CI) may comprise any of: signal strength/amplitude/phase/timestamp/spectral power measurement/modem parameters/dynamic beamforming information/beamforming report/dynamic imaging information/channel representation information (CRI)/spatial map from dynamic beaming/transfer function components/radio state/measurable variables/sensing data/measurement/coarse/fine-grained layer information (e.g. PHY/MAC/datalink layer)/digital gain/RF filter/frontend-switch/DC offset/correction/IQ-compensation settings/environment effect on wireless signal propagation/channel input-to-output transformation/stable behavior of environment/state profile/wireless channel measurements/received signal strength indicator (RSSI)/channel state information (CSI)/channel impulse response (CIR)/channel frequency response (CFR)/channel response (CR)/characteristics of frequency components (e.g. subcarriers)/channel characteristics/channel filter response, auxiliary information, data/meta/user/account/access/security/session/status/supervisory/device/network/household/neighborhood/environment/real-time/sensor/stored/encrypted/compressed/protected data, identity/identifier/identification.

Each CI may be associated with timestamp/arrival time/frequency band/signature/phase/amplitude/trend/characteristics, frequency-like characteristics, time/frequency/time-frequency domain element, orthogonal/non-orthogonal decomposition characteristics of signal through channel. Timestamps of TSCI may be irregular and may be corrected (e.g. by interpolation/resampling) to be regular, at least for a sliding time window.

TSCI may be/comprise a link-wise TSCI associated with an antenna of Type1 device and an antenna of Type2 device. For Type1 device with M antennas and Type2 device with N antennas, there may be MN link-wise TSCI.

CI/TSCI may be preprocessed/processed/postprocessed/stored/retrieved/transmitted/received. Some modem/radio state parameter may be held constant. Modem parameters may be applied to radio subsystem and may represent radio state. Motion detection signal (e.g. baseband signal, packet decoded/demodulated from it) may be obtained by processing (e.g. down-converting) wireless signal (e.g. RF/WiFi/LTE/5G/6G signal) by radio subsystem using radio state represented by stored modem parameters. Modem parameters/radio state may be updated (e.g. using previous modem parameters/radio state). Both previous/updated modem parameters/radio states may be applied in radio subsystem (e.g. to process signal/decode data). In the disclosed system, both may be obtained/compared/analyzed/processed/monitored.

Each CI may comprise N1 CI components (CIC) (e.g. time/frequency domain component, decomposition components), each with corresponding CIC index. Each CIC may comprise a real/imaginary/complex quantity, magnitude/phase/Boolean/flag, and/or some combination/subset. Each CI may comprise a vector/matrix/set/collection of CIC. CIC of TSCI associated with a particular CIC index may form a CIC time series. TSCI may be divided into N1 time series of CIC (TSCIC), each associated with respective CIC index. Characteristics/STI/MI may be monitored based on TSCIC. Some TSCIC may be selected based on some criteria/cost function/signal quality metric (e.g. SNR, interference level) for further processing.

Multi-component characteristics/STI/MI of multiple TSCIC (e.g. two components with indices 6 and 7, or three components indexed at 6, 7, 10) may be computed. In particular, k-component characteristics may be a function of k TSCIC with k corresponding CIC indices. With k=1, it is single-component characteristics which may constitute/form a one-dimensional (1D) function as CIC index spans all possible values. For k=2, two-component characteristics may constitute/form a 2D function. In special case, it may depend only on difference between the two indices. In such case, it may constitute 1D function. A total characteristics may be computed based on one or more multi-component characteristics (e.g. weighted average/aggregate). Characteristics/STI/MI of object/motion/expression may be monitored based on any multi-component characteristics/total characteristics.

Characteristics/STI/MI may comprise: instantaneous/short-/long-term/historical/repetitive/repeated/repeatable/recurring/periodic/pseudoperiodic/regular/habitual/incremental/average/initial/final/current/past/future/predicted/changing/deviational/change/time/frequency/orthogonal/non-orthogonal/transform/decomposition/deterministic/stochastic/probabilistic/dominant/key/prominent/representative/characteristic/significant/insignificant/indicative/common/averaged/shared/typical/prototypical/persistent/abnormal/abrupt/impulsive/sudden/unusual/unrepresentative/atypical/suspicious/dangerous/alarming/evolving/transient/one-time quantity/characteristics/analytics/feature/information, cause-and-effect, correlation indicator/score, auto/cross correlation/covariance, autocorrelation function (ACF), spectrum/spectrogram/power spectral density, time/frequency function/transform/projection, initial/final/temporal/change/trend/pattern/tendency/inclination/behavior/activity/history/profile/event, location/position/localization/spatial coordinate/change on map/path/navigation/tracking, linear/rotational/horizontal/vertical/location/distance/displacement/height/speed/velocity/acceleration/change/angular speed, direction/orientation, size/length/width/height/azimuth/area/volume/capacity, deformation/transformation, object/motion direction/angle/shape/form/shrinking/expanding, behavior/activity/movement, occurrence, fall-down/accident/security/event, period/frequency/rate/cycle/rhythm/count/quantity, timing/duration/interval, starting/initiating/ending/current/past/next time/quantity/information, type/grouping/classification/composition, presence/absence/proximity/approaching/receding/entrance/exit, identity/identifier, head/mouth/eye/ breathing/heart/hand/handwriting/arm/body/gesture/leg/gait/organ characteristics, tidal volume/depth of breath/airflow rate/inhale/exhale time/ratio, gait/walking/tool/machine/complex motion, signal/motion characteristic/information/feature/statistics/parameter/magnitude/phase/degree/dynamics/anomaly/variability/detection/estimation/recognition/identification/indication, slope/derivative/higher order derivative of function/feature/mapping/transformation of another characteristics, mismatch/distance/similarity score/cost/metric, Euclidean/statistical/weighted distance, L1/L2/Lk norm, inner/outer product, tag, test quantity, consumed/unconsumed quantity, state/physical/health/well-being/emotional/mental state, output responses, any composition/combination, and/or any related characteristics/information/combination.

Test quantities may be computed. Characteristics/STI/MI may be computed/monitored based on CI/TSCI/features/similarity scores/test quantities. Static (or dynamic) segment/profile may be identified/computed/analyzed/monitored/extracted/obtained/marked/presented/indicated/highlighted/stored/communicated by analyzing CI/TSCI/features/functions of features/test quantities/characteristics/STI/MI (e.g. target motion/movement presence/detection/estimation/recognition/identification). Test quantities may be based on CI/TSCI/features/functions of features/characteristics/STI/MI. Test quantities may be processed/tested/analyzed/compared.

Test quantity may comprise any/any function of: data/vector/matrix/structure, characteristics/STI/MI, CI information (CII, e.g. CI/CIC/feature/magnitude/phase), directional information (DI, e.g. directional CII), dominant/representative/characteristic/indicative/key/archetypal/exemplary/paradigmatic/prominent/common/shared/typical/prototypical/averaged/regular/persistent/usual/normal/atypical/unusual/abnormal/unrepresentative data/vector/matrix/structure, similarity/mismatch/distance score/cost/metric, auto/cross correlation/covariance, sum/mean/average/weighted/trimmed/arithmetic/geometric/harmonic mean, variance/deviation/absolute/square deviation/averaged/median/total/standard deviation/derivative/slope/variation/total/absolute/square variation/spread/dispersion/variability, divergence/skewness/kurtosis/range/interquartile range/coefficient of variation/dispersion/L-moment/quartile coefficient of dispersion/mean absolute/square difference/Gini coefficient/relative mean difference/entropy/maximum (max)/minimum (min)/median/percentile/quartile, variance-to-mean ratio, max-to-min ratio, variation/regularity/similarity measure, transient event/behavior, statistics/mode/likelihood/histogram/probability distribution function (pdf)/moment generating function/expected function/value, behavior, repeatedness/periodicity/pseudo-periodicity, impulsiveness/suddenness/occurrence/recurrence, temporal profile/characteristics, time/timing/duration/period/frequency/trend/history, starting/initiating/ending time/quantity/count, motion classification/type, change, temporal/frequency/cycle change, etc.

Identification/identity/identifier/ID may comprise: MAC address/ASID/USID/AID/UID/UUID, label/tag/index, web link/address, numeral/alphanumeric ID, name/password/account/account ID, and/or another ID. ID may be assigned (e.g. by software/firmware/user/hardware, hardwired, via dongle). ID may be stored/retrieved (e.g. in database/memory/cloud/edge/local/hub server, stored locally/remotely/permanently/temporarily). ID may be associated with any of: user/customer/household/information/data/address/phone number/social security number, user/customer number/record/account, timestamp/duration/timing. ID may be made available to Type1/Type2 device/sensing/SBP initiator/responder. ID may be for registration/initialization/communication/identification/verification/detection/recognition/authentication/access control/cloud access/networking/social networking/logging/recording/cataloging/classification/tagging/association/pairing/transaction/electronic transaction/intellectual property control (e.g. by local/cloud/server/hub, Type1/Type2/nearby/user/another device, user).

Object may be person/pet/animal/plant/machine/user, baby/child/adult/older person, expert/specialist/leader/commander/manager/personnel/staff/officer/doctor/nurse/worker/teacher/technician/serviceman/repairman/passenger/patient/customer/student/traveler/inmate/high-value person/object to be tracked, vehicle/car/AGV/drone/robot/wagon/transport/remote-controlled machinery/cart/moveable objects/goods/items/material/parts/components/machine/lift/elevator, merchandise/goods/cargo/people/items/food/package/luggage/equipment/cleaning tool in/on workflow/assembly-line/warehouse/factory/store/supermarket/distribution/logistic/transport/manufacturing/retail/wholesale/business center/facility/hub, phone/computer/laptop/tablet/dongle/plugin/companion/tool/peripheral/accessory/wearable/furniture/appliance/amenity/gadget, IoT/networked/smart/portable devices, watch/glasses/speaker/toys/stroller/keys/wallet/purse/handbag/backpack, goods/cargo/luggage/equipment/motor/machine/utensil/table/chair/air-conditioner/door/window/heater/fan, light/fixture/stationary object/television/camera/audio/video/surveillance equipment/parts, ticket/parking/toll/airplane ticket, credit/plastic/access card, object with fixed/changing/no form, mass/solid/liquid/gas/fluid/smoke/fire/flame, signage, electromagnetic (EM) source/medium, and/or another object.

Object may have multiple parts, each with different movement (e.g. position/location/direction change). Object may be a person walking forward. While walking, his left/right hands may move in different directions, with different instantaneous motion/speed/acceleration.

Object may/may not be communicatively coupled with some network, such as WiFi, MiFi, 4G/LTE/5G/6G/7G/8G, Bluetooth/NFC/BLE/WiMax/Zigbee/mesh/adhoc network. Object may be bulky machinery with AC power supply that is moved during installation/cleaning/maintenance/renovation. It may be placed on/in moveable platforms such as elevator/conveyor/lift/pad/belt/robot/drone/forklift/car/boat/vehicle. Type1/Type2 device may attach to/move with object. Type1/Type2 device may be part of/embedded in portable/another device (e.g. module/device with module, which may be large/sizeable/small/heavy/bulky/light, e.g. coin-sized/cigarette-box-sized). Type1/Type2/portable/another device may/may not be attached to/move with object, and may have wireless (e.g. via Bluetooth/BLE/Zigbee/NFC/WiFi) or wired (e.g. USB/micro-USB/Firewire/HDMI) connection with a nearby device for network access (e.g. via WiFi/cellular network). Nearby device may be object/phone/AP/IoT/device/appliance/peripheral/amenity/furniture/vehicle/gadget/wearable/networked/computing device. Nearby device may be connected to some server (e.g. cloud server via network/internet). It may/may not be portable/moveable, and may/may not move with object. Type1/Type2/portable/nearby/another device may be powered by battery/solar/DC/AC/other power source, which may be replaceable/non-replaceable, and rechargeable/non-rechargeable. It may be wirelessly charged.

Type1/Type2/portable/nearby/another device may comprise any of: computer/laptop/tablet/pad/phone/printer/ monitor/battery/antenna, peripheral/accessory/socket/plug/charger/switch/adapter/dongle, internet-of-thing (IoT), TV/sound bar/HiFi/speaker/set-top box/remote control/panel/gaming device, AP/cable/broadband/router/repeater/extender, appliance/utility/fan/refrigerator/washer/dryer/microwave/oven/stove/range/light/lamp/tube/pipe/tap/lighting/air-conditioner/heater/smoke detector, wearable/watch/glasses/goggle/button/bracelet/chain/jewelry/ring/belt/clothing/garment/fabric/shirt/pant/dress/glove/handwear/shoe/footwear/hat/headwear/bag/purse/wallet/makeup/cosmetic/ornament/book/magazine/paper/stationary/signage/poster/display/printed matter, furniture/fixture/table/desk/chair/sofa/bed/cabinet/shelf/rack/storage/box/bucket/basket/packaging/carriage/tile/shingle/brick/block/bat/panel/curtain/cushion/pad/carpet/material/building material/glass, amenity/sensor/clock/pot/pan/ware/container/bottle/can/utensil/plate/cup/bowl/toy/ball/tool/pen/racket/lock/bell/camera/microphone/painting/frame/mirror/coffee-maker/door/window, food/pill/medicine, embeddable/implantable/gadget/instrument/equipment/device/apparatus/machine/controller/mechanical tool, garage-opener, key/plastic/payment/credit card/ticket, solar panel, key tracker, fire-extinguisher, garbage can/bin, WiFi-enabled device, smart device/machine/machinery/system/house/office/building/warehouse/facility/vehicle/car/bicycle/motorcycle/boat/vessel/airplane/cart/wagon, home/vehicle/office/factory/building/manufacturing/production/computing/security/another device.

One/two/more of Type1/Type2/portable/nearby/another device/server may determine an initial characteristics/STI/MI of object, and/or may share intermediate information. One of Type1/Type2 device may move with object (e.g. "Tracker Bot"). The other one of Type1/Type2 device may not move with object (e.g. "Origin Satellite", "Origin Register"). Either may have known characteristics/STI/MI. Initial characteristics/STI/MI may be computed based on known characteristics/STI/MI.

Venue may be any space such as sensing area, room/house/home/office/workplace/building/facility/warehouse/factory/store/vehicle/property, indoor/outdoor/enclosed/semi-enclosed/open/semi-open/closed/over-air/floating/underground space/area/structure/enclosure, space/area with wood/glass/metal/material/structure/frame/beam/panel/column/wall/floor/door/ceiling/window/cavity/gap/opening/reflection/refraction medium/fluid/construction material/fixed/adjustable layout/shape, human/animal/plant body/cavity/organ/bone/blood/vessel/air-duct/windpipe/teeth/soft/hard/rigid/non-rigid tissue, manufacturing/repair/maintenance/mining/parking/storage/transportation/shipping/logistic/sports/entertainment/amusement/public/recreational/government/community/seniors/elderly care/geriatric/space facility/terminal/hub, distribution center/store, machine/engine/device/assembly line/workflow, urban/rural/suburban/metropolitan area, staircase/escalator/elevator/hallway/walkway/tunnel/cave/cavern/channel/duct/pipe/tube/lift/well/pathway/roof/basement/den/alley/road/path/highway/sewage/ventilation system/network, car/truck/bus/van/container/ship/boat/submersible/train/tram/airplane/mobile home, stadium/city/playground/park/field/track/court/gymnasium/hall/mart/market/supermarket/plaza/square/construction site/hotel/museum/school/hospital/university/garage/mall/airport/train/bus station/terminal/hub/platform, valley/forest/wood/terrain/landscape/garden/park/patio/land, and/or gas/oil/water pipe/line. Venue may comprise inside/outside of building/facility. Building/facility may have one/multiple floors, with a portion underground.

A event may be monitored based on TSCI. Event may be object/motion/gesture/gait related, such as fall-down, rotation/hesitation/pause, impact (e.g. person hitting sandbag/door/bed/window/chair/table/desk/cabinet/box/another window/chair/table/desk/cabinet/box/another person/animal/bird/fly/ball/bowling/tennis/soccer/volley ball/football/baseball/basketball), two-body action (e.g. person releasing balloon/catching fish/molding clay/writing paper/typing on computer), car moving in garage, person carrying smart phone/walking around venue, autonomous/moveable object/machine moving around (e.g. vacuum cleaner/utility/self-driving vehicle/car/drone).

Task may comprise: (a) sensing task, any of: monitoring/sensing/detection/recognition/estimation/verification/identification/authentication/classification/locationing/guidance/navigation/tracking/counting of/in any of: object/objects/vehicle/machine/tool/human/baby/elderly/patient/intruder/pet presence/proximity/activity/daily-activity/well-being/breathing/vital sign/heartbeat/health condition/sleep/sleep stage/walking/location/distance/speed/acceleration/navigation/tracking/exercise/safety/danger/fall-down/intrusion/security/life-threat/emotion/movement/motion/degree/pattern/periodic/repeated/cyclo-stationary/stationary/regular/transient/sudden/suspicious motion/irregularity/trend/change/breathing/human biometrics/environment informatics/gait/gesture/room/region/zone/venue, (b) computation task, any of: signal processing/preprocess/postprocessing/conditioning/denoising/calibration/analysis/feature extraction/transformation/mapping/supervised/unsupervised/semi-supervised/discriminative/machine/deep learning/training/clustering/training/PCA/eigen-decomposition/frequency/time/functional decomposition/neural network/map-based/model-based processing/correction/geometry estimation/analytics computation, (c) IoT task, any of: smart task for venue/user/object/human/pet/house/home/office/workplace/building/facility/warehouse/factory/store/vehicle/property/structure/assembly-line/IoT/device/system, energy/power management/transfer, wireless power transfer, interacting/engage with user/object/intruder/human/animal (e.g. presence/motion/gesture/gait/activity/behavior/voice/command/instruction/query/music/sound/image/video/location/movement/danger/threat detection/recognition/monitoring/analysis/response/execution/synthesis, generate/retrieve/play/display/render/synthesize dialog/exchange/response/presentation/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), activating/controlling/configuring (e.g. turn on/off/control/lock/unlock/open/close/adjust/configure) a device/system (e.g. vehicle/drone/electrical/mechanical/air-conditioning/heating/lighting/ventilation/clearning/entertainment/IoT/security/siren/access system/device/door/window/garage/lift/elevator/escalator/speaker/television/light/peripheral/accessory/wearable/furniture/appliance/amenity/gadget/alarm/camera/gaming/coffee/cooking/heater/fan/housekeeping/home/office machine/device/robot/vacuum cleaner/assembly line), (d) miscellaneous task, any of: transmission/coding/encryption/storage/analysis of data/parameters/analytics/derived data, upgrading/administration/configuration/coordination/broadcasting/synchronization/networking/encryption/communication/protection/compression/storage/database/archiving/query/cloud computing/presentation/augmented/virtual reality/other processing/task. Task may be performed by some of: Type1/Type2/nearby/portable/another device, and/ or hub/local/edge/cloud server.

Task may also comprise: detect/recognize/monitor/locate/ interpret/analyze/record/store user/visitor/intruder/object/ pet, interact/engage/converse/dialog/exchange with user/object/visitor/intruder/human/baby/pet, detect/locate/localize/ recognize/monitor/analyze/interpret/learn/train/respond/ execute/synthesize/generate/record/store/summarize health/ well-being/daily-life/activity/behavior/pattern/exercise/ food-intake/restroom visit/work/play/rest/sleep/relaxation/ danger/routine/timing/habit/trend/normality/normalcy/ anomaly/regularity/irregularity/change/presence/motion/ gesture/gait/expression/emotion/state/stage/voice/ command/instruction/question/query/music/sound/location/ movement/fall-down/threat/discomfort/sickness/ environment/generate/retrieve/play/display/render/ synthesize dialog/exchange/response/presentation/report/ experience/media/multimedia/expression/sound/speech/ music/image/imaging/video/animation/webpage/text/ message/notification/reminder/enquiry/warning, detect/ recognize/monitor/interpret/analyze/record/store user/ intruder/object input/motion/gesture/location/activity), detect/check/monitor/locate/manage/control/adjust/configure/lock/unlock/arm/disarm/open/close/fully/partially/activate/turn on/off some system/device/object (e.g. vehicle/ robot/drone/electrical/mechanical/air-conditioning/heating/ ventilation/HVAC/lighting/cleaning/entertainment/IoT/ security/siren/access systems/devices/items/components, door/window/garage/lift/elevator/escalator/speaker/television/light/peripheral/accessory/wearable/furniture/appliance/amenity/gadget/alarm/camera/gaming/coffee/cooking/ heater/fan/housekeeping/home/office machine/device/ vacuum cleaner/assembly line/window/garage/door/blind/ curtain/panel/solar panel/sun shade), detect/monitor/locate user/pet do something (e.g. sitting/sleeping on sofa/in bedroom/running on treadmill/cooking/watching TV/eating in kitchen/dining room/going upstairs/downstairs/outside/inside/using rest room), do something (e.g. generate message/ response/warning/clarification/notification/report) automatically upon detection, do something for user automatically upon detecting user presence, turn on/off/wake/control/adjust/dim light/music/radio/TV/HiFi/STB/computer/speaker/ smart device/air-conditioning/ventilation/heating system/ curtains/light shades, turn on/off/pre-heat/control coffee-machine/hot-water-pot/cooker/oven/microwave oven/ another cooking device, check/manage temperature/setting/ weather forecast/telephone/message/mail/system check, present/interact/engage/dialog/converse (e.g. through smart speaker/display/screen; via webpage/email/messaging system/notification system).

When user arrives home by car, task may be to, automatically, detect user/car approaching, open garage/door upon detection, turn on driveway/garage light as user approaches garage, and/or turn on air conditioner/heater/fan. As user enters house, task may be to, automatically, turn on entrance light/off driveway/garage light, play greeting message to welcome user, turn on user's favorite music/radio/news/ channel, open curtain/blind, monitor user's mood, adjust lighting/sound environment according to mood/current/imminent event (e.g. do romantic lighting/music because user is scheduled to eat dinner with girlfriend soon) on user's calendar, warm food in microwave that user prepared in morning, do diagnostic check of all systems in house, check weather forecast for tomorrow/news of interest to user, check calendar/to-do list, play reminder, check telephone answering/messaging system/email, give verbal report using dialog system/speech synthesis, and/or remind (e.g. using audible tool such as speakers/HiFi/speech synthesis/sound/ field/voice/music/song/dialog system, using visual tool such as TV/entertainment system/computer/notebook/tablet/display/light/color/brightness/patterns symbols, using haptic/ virtual reality/gesture/tool, using smart device/appliance/ material/furniture/fixture, using server/hub device/cloud/ fog/edge server/home/mesh network, using messaging/ notification/communication/scheduling/email tool, using UI/GUI, using scent/smell/fragrance/taste, using neural/nervous system/tool, or any combination) user of someone's birthday/call him, prepare/give report. Task may turn on air conditioner/heater/ventilation system in advance, and/or adjust temperature setting of smart thermostat in advance. As user moves from entrance to living room, task may be to turn on living room light, open living room curtain, open window, turn off entrance light behind user, turn on TV/set-top box, set TV to user's favorite channel, and/or adjust an appliance according to user's preference/conditions/states (e.g. adjust lighting, choose/play music to build romantic atmosphere).

When user wakes up in morning, task may be to detect user moving around in bedroom, open blind/curtain/window, turn off alarm clock, adjust temperature from nighttime to day-time profile, turn on bedroom light, turn on restroom light as user approaches restroom, check radio/ streaming channel and play morning news, turn on coffee machine, preheat water, and/or turn off security system. When user walks from bedroom to kitchen, task may be to turn on kitchen/hallway lights, turn off bedroom/restroom lights, move music/message/reminder from bedroom to kitchen, turn on kitchen TV, change TV to morning news channel, lower kitchen blind, open kitchen window, unlock backdoor for user to check backyard, and/or adjust temperature setting for kitchen.

When user leaves home for work, task may be to detect user leaving, play farewell/have-a-good-day message, open/ close garage door, turn on/off garage/driveway light, close/ lock all windows/doors (if user forgets), turn off appliance (e.g. stove/microwave/oven), turn on/arm security system, adjust light/air-conditioning/heating/ventilation systems to "away" profile to save energy, and/or send alerts/reports/ updates to user's smart phone.

Motion may comprise any of: no-motion, motion sequence, resting/non-moving motion, movement/change in position/location, daily/weekly/monthly/yearly/repeating/ activity/behavior/action/routine, transient/time-varying/fall-down/repeating/repetitive/periodic/pseudo-periodic motion/ breathing/heartbeat, deterministic/non-deterministic/ probabilistic/chaotic/random motion, complex/combination motion, non-/pseudo-/cyclo-/stationary random motion, change in electro-magnetic characteristics, human/animal/ plant/body/machine/mechanical/vehicle/drone motion, air-/ wind-/weather-/water-/fluid-/ground/sub-surface/seismic motion, man-machine interaction, normal/abnormal/dangerous/warning/suspicious motion, imminent/rain/fire/flood/ tsunami/explosion/collision, head/facial/eye/mouth/tongue/ neck/finger/hand/arm/shoulder/upper/lower/body/chest/ abdominal/hip/leg/foot/joint/knee/elbow/skin/below-skin/ subcutaneous tissue/blood vessel/intravenous/organ/heart/ lung/stomach/intestine/bowel/eating/breathing/talking/ singing/dancing/coordinated motion, facial/eye/mouth expression, and/or hand/arm/gesture/gait/UI/keystroke/typing stroke.

Type1/Type2 device may comprise heterogeneous IC, low-noise amplifier (LNA), power amplifier, transmit-receive switch, media access controller, baseband radio, and/ or 2.4/3.65/4.9/5/6/sub-7/over-7/28/60/76 GHz/another radio. Heterogeneous IC may comprise processor/memory/software/firmware/instructions. It may support broadband/wireless/mobile/mesh/cellular network, WLAN/WAN/MAN, standard/IEEE/3GPP/WiFi/4G/LTE/5G/6G/7G/8G, IEEE 802.11/a/b/g/n/ac/ad/af/ah/ax/ay/az/be/bf/15/16, and/or Bluetooth/BLE/NFC/Zigbee/WiMax.

Processor may comprise any of: general-/special-/purpose/embedded/multi-core processor, microprocessor/microcontroller, multi-/parallel/CISC/RISC processor, CPU/GPU/DSP/ASIC/FPGA, and/or logic circuit. Memory may comprise non-/volatile, RAM/ROM/EPROM/EEPROM, hard disk/SSD, flash memory, CD-/DVD-ROM, magnetic/optical/organic/storage system/network, network/cloud/edge/local/external/internal storage, and/or any non-transitory storage medium. Set of instructions may comprise machine executable codes in hardware/IC/software/firmware, and may be embedded/pre-loaded/loaded upon-boot-up/on-the-fly/on-demand/pre-installed/installed/downloaded.

Processing/preprocessing/postprocessing may be applied to data (e.g. TSCI/feature/characteristics/STI/MI/test quantity/intermediate/data/analytics) and may have multiple steps. Step/pre-/post-/processing may comprise any of: computing function of operands/LOS/non-LOS/single-link/multi-link/component/item/quantity, magnitude/norm/phase/feature/energy/timebase/similarity/distance/characterization score/measure computation/extraction/correction/cleaning, linear/nonlinear/FIR/IIR/MA/AR/ARMA/Kalman/particle filtering, lowpass/bandpass/highpass/median/rank/quartile/percentile/mode/selective/adaptive filtering, interpolation/intrapolation/extrapolation/decimation/subsampling/upsampling/resampling, matched filtering/enhancement/restoration/denoising/smoothing/conditioning/spectral analysis/mean subtraction/removal, linear/nonlinear/inverse/frequency/time transform, Fourier transform (FT)/DTFT/DFT/FFT/wavelet/Laplace/Hilbert/Hadamard/trigonometric/sine/cosine/DCT/power-of-2/sparse/fast/frequency transform, zero/cyclic/padding, graph-based transform/processing, decomposition/orthogonal/non-orthogonal/over-complete projection/eigen-decomposition/SVD/PCA/ICA/compressive sensing, grouping/folding/sorting/comparison/soft/hard/thresholding/clipping, first/second/high order derivative/integration/convolution/multiplication/division/addition/subtraction, local/global/maximization/minimization, recursive/iterative/constrained/batch processing, least mean square/absolute error/deviation, cost function optimization, neural network/detection/recognition/classification/identification/estimation/labeling/association/tagging/mapping/remapping/training/clustering/machine/supervised/unsupervised/semi-supervised learning/network, vector/quantization/encryption/compression/matching pursuit/scrambling/coding/storing/retrieving/transmitting/receiving/time-domain/frequency-domain/normalization/scaling/expansion/representing/merging/combining/splitting/tracking/monitoring/shape/silhouette/motion/activity/analysis, pdf/histogram estimation/importance/Monte Carlo sampling, error detection/protection/correction, doing nothing, time-varying/adaptive processing, conditioning/weighted/averaging/over selected components/links, arithmetic/geometric/harmonic/trimmed mean/centroid/medoid computation, morphological/logical operation/permutation/combination/sorting/AND/OR/XOR/union/intersection, vector operation/addition/subtraction/multiplication/division, and/or another operation. Processing may be applied individually/jointly. Acceleration using GPU/DSP/coprocessor/multicore/multiprocessing may be applied.

Function may comprise: characteristics/feature/magnitude/phase/energy, scalar/vector/discrete/continuous/polynomial/exponential/logarithmic/trigonometric/transcendental/logical/piecewise/linear/algebraic/nonlinear/circular/piecewise linear/real/complex/vector-valued/inverse/absolute/indicator/limiting/floor/rounding/sign/composite/sliding/moving function, derivative/integration, function of function, one-to-one/one-to-many/many-to-one/many-to-many function, mean/mode/median/percentile/max/min/range/statistics/histogram, local/global max/min/zero-crossing, variance/variation/spread/dispersion/deviation/standard deviation/divergence/range/interquartile range/total variation/absolute/total deviation, arithmetic/geometric/harmonic/trimmed mean/square/cube/root/power, thresholding/clipping/rounding/truncation/quantization/approximation, time function processed with an operation (e.g. filtering), sine/cosine/tangent/cotangent/secant/cosecant/elliptical/parabolic/hyperbolic/game/zeta function, probabilistic/stochastic/random/ergodic/stationary/deterministic/periodic/repeated function, inverse/transformation/frequency/discrete time/Laplace/Hilbert/sine/cosine/triangular/wavelet/integer/power-of-2/sparse transform, orthogonal/non-orthogonal/eigen projection/decomposition/eigenvalue/singular value/PCA/ICA/SVD/compressive sensing, neural network, feature extraction, function of moving window of neighboring items of time series, filtering function/convolution, short-time/discrete transform/Fourier/cosine/sine/Hadamard/wavelet/sparse transform, matching pursuit, approximation, graph-based processing/transform/graph signal processing, classification/identification/class/group/category/labeling, processing/preprocessing/postprocessing, machine/learning/detection/estimation/feature extraction/learning network/feature extraction/denoising/signal enhancement/coding/encryption/mapping/vector quantization/remapping/lowpass/highpass/bandpass/matched/Kalman/particle/FIR/IIR/MA/AR/ARMA/median/mode/adaptive filtering, first/second/high order derivative/integration/zero crossing/smoothing, up/down/random/importance/Monte Carlo sampling/resampling/converting, interpolation/extrapolation, short/long term statistics/auto/cross correlation/moment generating function/time averaging/weighted averaging, special/Bessel/Beta/Gamma/Gaussian/Poisson/integral complementary error function.

Sliding time window may have time-varying width/size. It may be small/large at beginning to enable fast/accurate acquisition and increase/decrease over time to steady-state size comparable to motion frequency/period/transient motion duration/characteristics/STI/MI to be monitored. Window size/time shift between adjacent windows may be constant/adaptively/dynamically/automatically changed/adjusted/varied/modified (e.g. based on battery life/power consumption/available computing power/change in amount of targets/nature of motion to be monitored/user request/choice/instruction/command).

Characteristics/STI/MI may be determined based on characteristic value/point of function and/or associated argument of function (e.g. time/frequency). Function may be outcome of a regression. Characteristic value/point may comprise local/global/constrained/significant/first/second/i^th maximum/minimum/extremum/zero-crossing (e.g. with positive/negative time/frequency/argument) of function. Local signal-to-noise-ratio (SNR) or SNR-like parameter may be computed for each pair of adjacent local max (peak)/local min (valley) of function, which may be some function (e.g.

linear/log/exponential/monotonic/power/polynomial) of fraction or difference of a quantity (e.g. power/magnitude) of local max over the quantity of local min. Local max (or min) may be significant if its SNR is greater than threshold and/or if its amplitude is greater (or smaller) than another threshold. Local max/min may be selected/identified/computed using persistence-based approach. Some significant local max/min may be selected based on selection criterion (e.g. quality criterion/condition, strongest/consistent significant peak in a range). Unselected significant peaks may be stored/monitored as "reserved" peaks for use in future selection in future sliding time windows. E.g. a particular peak (e.g. at particular argument/time/frequency) may appear consistently over time. Initially, it may be significant but not selected (as other peaks may be stronger). Later, it may become stronger/dominant consistently. When selected, it may be back-traced in time and selected in earlier time to replace previously selected peaks (momentarily strong/dominant but not persistent/consistent). Consistency of peak may be measured by trace, or duration of being significant. Alternatively, local max/min may be selected based on finite state machine (FSM). Decision thresholds may be time-varying, adjusted adaptively/dynamically (e.g. based on back-tracing timing/FSM, or data distribution/statistics).

A similarity score (SS)/component SS may be computed based on two temporally adjacent CI/CIC, of one TSCI or of two different TSCI. The pair may come from same/different sliding window (s). SS or component SS may comprise: time reversal resonating strength (TRRS), auto/cross correlation/covariance, inner product of two vectors, L1/L2/Lk/Euclidean/statistical/weighted/distance score/norm/metric/quality metric, signal quality condition, statistical characteristics, discrimination score, neural network/deep learning network/machine learning/training/discrimination/weighted averaging/preprocessing/denoising/signal conditioning/filtering/time correction/timing compensation/phase offset compensation/transformation/component-wise operation/feature extraction/FSM, and/or another score.

Any threshold may be fixed (e.g. 0, 0.5, 1, 1.5, 2), pre-determined and/or adaptively/dynamically determined (e.g. by FSM, or based on time/space/location/antenna/path/link/state/battery life/remaining battery life/available resource/power/computation power/network bandwidth). Threshold may be applied to test quantity to differentiate two events/conditions/situations/states, A and B. Data (e.g. CI/TSCI/feature/similarity score/test quantity/characteristics/STI/MI) may be collected under A/B in training situation. Test quantity (e.g. its distribution) computed based on data may be compared under A/B to choose threshold based on some criteria (e.g. maximum likelihood (ML), maximum aposterior probability (MAP), discriminative training, minimum Type 1 (or 2) error for given Type 2 (or 1) error, quality criterion, signal quality condition). Threshold may be adjusted (e.g. to achieve different sensitivity), automatically/semi-automatically/manually/adaptively/dynamically, once/sometimes/often/periodically/repeatedly/occasionally/sporadically/on-demand (e.g. based on object/movement/location direction/action/characteristics/STI/MI/size/property/trait/habit/behavior/venue/feature/fixture/furniture/barrier/material/machine/living thing/thing/boundary/surface/medium/map/constraint/model/event/state/situation/condition/time/timing/duration/state/history/u ser/preference). An iterative algorithm may stop after N iterations, after time-out period, or after test quantity satisfies a condition (e.g. updated quantity greater than threshold) which may be fixed/adaptively/dynamically adjusted.

Searching for local extremum may comprise constrained/minimization/maximization, statistical/dual/constraint/convex/global/local/combinatorial/infinite-dimensional/multi-objective/multi-modal/non-differentiable/particle-swarm/simulation-based optimization, linear/nonlinear/quadratic/higher-order regression, linear/nonlinear/stochastic/constraint/dynamic/mathematical/disjunctive/convex/semidefinite/conic/cone/interior/fractional/integer/sequential/quadratic programming, conjugate/gradient/subgradient/coordinate/reduced descent, Newton's/simplex/iterative/point/ellipsoid/quasi-Newton/interpolation/memetic/genetic/evolutionary/pattern-/gravitational-search method/algorithm, constraint satisfaction, calculus of variations, optimal control, space mapping, heuristics/meta-heuristics, numerical analysis, simultaneous perturbation stochastic approximation, stochastic tunneling, dynamic relaxation, hill climbing, simulated annealing, differential evolution, robust/line/Tabu/reactive search/optimization, curve fitting, least square, variational calculus, and/or variant. It may be associated with an objective/loss/cost/utility/fitness/energy function.

Regression may be performed using regression function to fit data, or function (e.g. ACF/transform/mapped) of data, in regression window. During iterations, length/location of regression window may be changed. Regression function may be linear/quadratic/cubic/polynomial/another function. Regression may minimize any of: mean/weighted/absolute/square deviation, error, aggregate/component/weighted/mean/sum/absolute/square/high-order/another error/cost (e.g. in projection domain/selected axes/orthogonal axes), robust error (e.g. first error (e.g. square) for smaller error magnitude, second error (e.g. absolute) for larger error magnitude), and/or weighted sum/mean of multiple errors (e.g. absolute/square error). Error associated with different links/path may have different weights (e.g. link with less noise may have higher weight). Regression parameter (e.g. time-offset associated with max/min regression error of regression function in regression window, location/width of window) may be initialized and/or updated during iterations (e.g. based on target value/range/profile, characteristics/STI/MI/test quantity, object motion/quantity/count/location/state, past/current trend, location/amount/distribution of local extremum in previous windows, carrier/subcarrier frequency/bandwidth of signal, amount of antennas associated with the channel, noise characteristics, histogram/distribution/central/F-distribution, and/or threshold). When converged, current time offset may be at center/left/right (or fixed relative location) of regression window.

In presentation, information may be displayed/presented (e.g. with venue map/environmental model). Information may comprise: current/past/corrected/approximate/map/location/speed/acceleration/zone/region/area/segmentation/coverage-area, direction/path/trace/history/traffic/summary, frequently-visited areas, customer/crowd event/distribution/behavior, crowd-control information, acceleration/speed/vital-sign/breathing/heart-rate/activity/emotion/sleep/state/rest information, motion-statistics/MI/STI, presence/absence of motion/people/pets/object/vital sign, gesture (e.g. hand/arm/foot/leg/body/head/face/mouth/eye)/meaning/control (control of devices using gesture), location-based gesture-control/motion-interpretation, identity/identifier (ID) (e.g. of object/person/user/pet/zone/region, device/machine/vehicle/drone/car/boat/bicycle/TV/air-con/fan/self-guided machine/device/vehicle), environment/weather information, gesture/gesture control/motion trace, earthquake/explosion/storm/rain/fire/temperature, collision/impact/vibration, event/door/window/open/close/fall-down/accident/burning/freezing/water-/wind-/air-movement event, repeated/pseudo-periodic event (e.g. running on treadmill, jumping up/down, skipping rope, somersault), and/or vehicle event. Location may be one/two/three dimensional (e.g. expressed/represented as 1D/2D/3D rectangular/polar coordinates), relative (e.g. w.r.t. map/environmental model) or relational (e.g. at/near/distance-from a point, halfway between two points, around corner, upstairs, on table top, at ceiling, on floor, on sofa).

Information (e.g. location) may be marked/displayed with some symbol. Symbol may be time-varying/flashing/pulsating with changing color/intensity/size/orientation. Symbol may be a number reflecting instantaneous quantity (e.g. analytics/gesture/state/status/action/motion/breathing/heart rate, temperature/network traffic/connectivity/remaining power). Symbol/size/orientation/color/intensity/rate/characteristics of change may reflect respective motion. Information may be in text or presented visually/verbally (e.g. using pre-recorded voice/voice synthesis)/mechanically (e.g. animated gadget, movement of movable part).

User device may comprise smart phone/tablet/speaker/camera/display/TV/gadget/vehicle/appliance/device/IoT, device with UI/GUI/voice/audio/record/capture/sensor/playback/display/animation/VR/AR (augmented reality)/voice (assistance/recognition/synthesis) capability, and/or tablet/laptop/PC.

Map/floor plan/environmental model (e.g. of home/office/building/store/warehouse/facility) may be 2-/3-/higher-dimensional. It may change/evolve over time (e.g. rotate/zoom/move/jump on screen). Walls/windows/doors/entrances/exits/forbidden areas may be marked. It may comprise multiple layers (overlays). It may comprise maintenance map/model comprising water pipes/gas pipes/wiring/cabling/air ducts/crawl-space/ceiling/underground layout.

Venue may be segmented/subdivided/zoned/grouped into multiple zones/regions/sectors/sections/territories/districts/precincts/localities/neighborhoods/areas/stretches/expance such as bedroom/living/dining/rest/storage/utility/warehouse/conference/work/walkway/kitchen/foyer/garage/first/second floor/offices/reception room/area/regions. Segments/regions/areas may be presented in map/floor plan/model with presentation characteristic (e.g. brightness/intensity/luminance/color/chrominance/texture/animation/flashing/rate).

An example of disclosed system/apparatus/method. Stephen and family want to install disclosed wireless motion detection system to detect motion in their 2000 sqft two-storey town house in Seattle, Washington. Because his house has two storeys, Stephen decides to use one Type2 device (named A) and two Type1 devices (named B and C) in ground floor. His ground floor has three rooms: kitchen, dining and living rooms arranged in straight line, with dining room in middle. He put A in dining room, and B in kitchen and C in living room, partitioning ground floor into 3 zones (dining room, living room, kitchen). When motion is detected by AB pair and/or AC pair, system would analyze TSCI/feature/characteristics/STI/MI and associate motion with one of 3 zones.

When Stephen and family go camping in holiday, he uses mobile phone app (e.g. Android phone app or iPhone app) to turn on motion detection system. If system detects motion, warning signal is sent to Stephen (e.g. SMS, email, push message to mobile phone app). If Stephen pays monthly fee (e.g. $10/month), a service company (e.g. security company) will receive warning signal through wired (e.g. broadband)/wireless (e.g. WiFi/LTE/5G) network and perform security procedure (e.g. call Stephen to verify any problem, send someone to check on house, contact police on behalf of Stephen).

Stephen loves his aging mother and cares about her well-being when she is alone in house.

When mother is alone in house while rest of family is out (e.g. work/shopping/vacation), Stephen turns on motion detection system using his mobile app to ensure mother is ok. He uses mobile app to monitor mother's movement in house. When Stephen uses mobile app to see that mother is moving around house among the three regions, according to her daily routine, Stephen knows that mother is ok. Stephen is thankful that motion detection system can help him monitor mother's well-being while he is away from house.

On typical day, mother would wake up at 7 am, cook her breakfast in kitchen for 20 minutes, eat breakfast in dining room for 30 minutes. Then she would do her daily exercise in living room, before sitting down on sofa in living room to watch favorite TV show. Motion detection system enables Stephen to see timing of movement in 3 regions of house. When motion agrees with daily routine, Stephen knows roughly that mother should be doing fine. But when motion pattern appears abnormal (e.g. no motion until 10 am, or in kitchen/motionless for too long), Stephen suspects something is wrong and would call mother to check on her. Stephen may even get someone (e.g. family member/neighbor/paid personnel/friend/social worker/service provider) to check on mother.

One day Stephen feels like repositioning a device. He simply unplugs it from original AC power plug and plugs it into another AC power plug. He is happy that motion detection system is plug-and-play and the repositioning does not affect operation of system. Upon powering up, it works right away.

Sometime later, Stephen decides to install a similar setup (i.e. one Type2 and two Type1 devices) in second floor to monitor bedrooms in second floor. Once again, he finds that system set up is extremely easy as he simply needs to plug Type2 device and Type1 devices into AC power plug in second floor. No special installation is needed. He can use same mobile app to monitor motion in both ground/second floors. Each Type2 device in ground/second floors can interact with all Type1 devices in both ground/second floors. Stephen has more than double capability with combined systems.

Disclosed system can be applied in many applications. Type1/Type2 devices may be any WiFi-enabled devices (e.g. smart IoT/appliance/TV/STB/speaker/refrigerator/stove/oven/microwave/fan/heater/air-con/router/phone/computer/tablet/accessory/plug/pipe/lamp/smoke detector/furniture/fixture/shelf/cabinet/door/window/lock/sofa/table/chair/piano/utensil/wearable/watch/tag/key/ticket/belt/wallet/pen/hat/necklace/implantable/phone/eyeglasses/glass panel/gaming device) at home/office/facility, on table, at ceiling, on floor, or at wall. They may be placed in conference room to count people. They may form a well-being monitoring system to monitor daily activities of older adults and detect any sign of symptoms (e.g. dementia, Alzheimer's disease). They may be used in baby monitors to monitor vital signs (breathing) of babies. They may be placed in bedrooms to monitor sleep quality and detect any sleep apnea. They may be placed in cars to monitor well-being of passengers and drivers, detect sleepy drivers or babies left in hot cars. They may be used in logistics to prevent human trafficking by monitoring any human hidden in trucks/containers. They may be deployed by emergency service at disaster area to search for trapped victims in debris. They may be deployed in security systems to detect intruders.

One can delve into the underlying multipath propagation properties and find a proximity feature based on the correlation of adjacent subcarriers to differentiate between nearby and faraway motion. This feature has been proven to be sensitive to the distance between a moving human and the devices.

However, due to its reliance on dynamic reflections from the human target, the proximity feature is highly affected by the strength of motion. For instance, when a person changes from larger movements such as walking to smaller movements such as reading after approaching the devices, the value of the proximity feature drops, causing the proximity detector to fail in continuously detecting the person in close proximity. Recognizing that humans typically approach or move away from devices by walking, one can consider gait information as supplementary factor to support human proximity detection. Gait can be inferred from the speed, which is not easily estimated from WiFi signals. The speed can be estimated from an autocorrelation function (ACF) of CSI based on a statistical model. With the ACF spectrum and speed information available, the present teaching discloses a gait score, which serves as an indicator of the presence of gait.

By further combining the proximity feature and gait information, the present teaching discloses a state machine that accumulates temporary information and triggers or un-triggers proximity detection only when a transition state, such as approaching or leaving, is detected. In this way, even if the detected human performs subtle movements after being initially detected, the proximity detection continues until the leaving state is identified.

In some embodiments, the present teaching discloses a robust WiFi-based proximity detector by considering gait monitoring during proximity detection. This proximity detector does not merely rely on the dynamic signal reflections whose extracted features are dependent on motion strength. In some embodiments, a novel gait score is disclosed to accurately evaluate gait presence by leveraging the speed estimated from the autocorrelation function (ACF) of channel state information (CSI). By combining this gait score with a proximity feature, the disclosed method effectively distinguishes different transition patterns, enabling more reliable proximity detection. In addition, to enhance the stability of the detection process, the system employs a state machine and extracts temporal information to effectively distinguish between nearby and faraway human beings, ensuring continuous proximity detection even during subtle movements (e.g. typing on a keyboard) and enhancing the stability of the detection process. Through extensive experiments in diverse environments, the disclosed system is validated and can achieve a high overall detection rate while maintaining a low false alarm rate across various scenarios. The disclosed proximity detection method and system will benefit applications in security systems, healthcare monitoring, and smart environments, with opportunities for future refinement and other real-world implementations.

In wireless communications, channel state information (CSI), or channel frequency response (CFR), describes the propagation of the WiFi signals from a transmitter (Tx) to a receiver (Rx). The CSI estimated over a subcarrier with frequency f at time t can be represented as $$H(t, f) = \frac{Y(t, f)}{X(t, f)} \quad (1)$$

where $X(t,f)$ and $Y(t,f)$ denote the transmitted signal by the Tx and the received signal at the Rx, respectively. Since the transmitted WiFi signals experience multiple reflections in their propagation in indoor environments, the corresponding CSI can be written as a collection of radio propagation along different paths:

$$H(t,f) = \sum_{l=1}^{L} \alpha_l(t) e^{-j2\pi f \tau_l(t)} \quad (2)$$

where $\alpha_l$ is the multipath coefficients of the l-th independent multipath component and $T_l$ is the associated propagation delay. In practice, since the imperfect synchronization of the commercial WiFi devices often results in random noise in the CSI phase that is difficult to be efficiently cleaned, one can rely on the more reliable CSI amplitude, which can be measured through the power response $G(t,f)$ as $$G(t, f) \triangleq |H(t, f)|^2 \quad (3)$$

FIG. 1 shows a diagram of an exemplary system 100 for proximity detection, according to some embodiments of the present disclosure. As depicted in FIG. 1, the system 100 includes a CSI Preprocessing module 110, a Proximity Monitoring module 120, a Gait Detection module 130 and a State Transition module 140. In some embodiments, the system 100 is a robust proximity detector based on WiFi signals.

CSI Preprocessing: In some embodiments, to mitigate the impact of the automatic gain controller on the CSI amplitude, the measured CSI power response $G(t,f)$ is first normalized followed by a Hampel filter, to remove the outliers in time domain. In some embodiment, this CSI preprocessing is performed by the CSI Preprocessing module 110 in FIG. 1.

Figure 2:
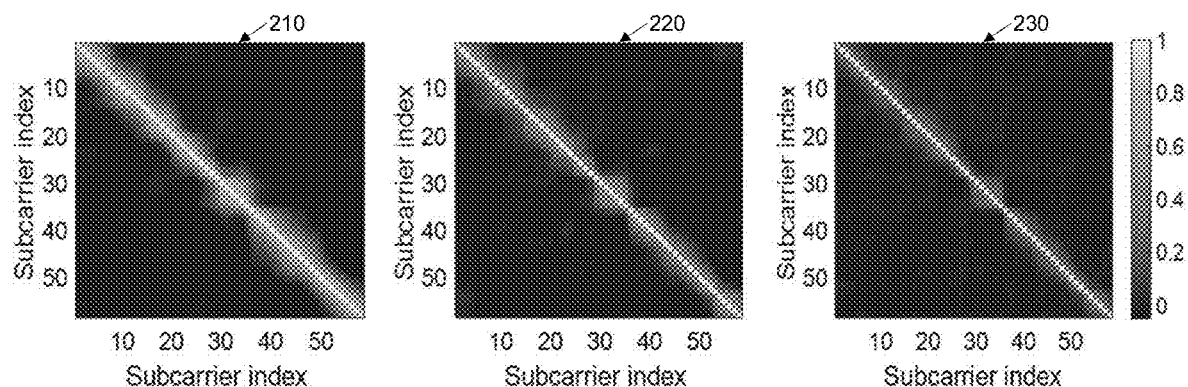
FIG. 2 shows some exemplary correlation matrices among subcarriers at different human device distances, according to some embodiments of the present disclosure.

Proximity Monitoring: The correlation of CSI power response on adjacent subcarriers is an effective indicator of the rough distance between the moving human and the WiFi devices. FIG. 2 shows correlation matrices 210, 220, 230 among subcarriers at human device distances of 1 m, 3 m and 5 m, respectively. As illustrated in FIG. 2, the closer the human motion to the WiFi device, the higher correlation between the CSI power response on adjacent subcarriers. Therefore, a proximity feature can be defined as $$F_p = \frac{1}{N_s - 1} \sum_{n=1}^{N_s - 1} \rho_G(f_n, f_{n+1}) \quad (4)$$

where $\rho_G(f_n, f_{n+1})$ is the correlation over adjacent subcarriers n and n+1, and $f_n$ and $f_{n+1}$ are the corresponding subcarrier frequencies.

In addition, one can utilize the slope ($F_s$) of the proximity feature $F_p$ within a certain time window in the disclosed proximity monitoring. As a human subject moves closer to or farther away from the device, the value of $F_p$ correspondingly increases or decreases. Consequently, the slope $F_s$ captures the informative trend of $F_p$, enabling the system to gain valuable insights into the dynamics of proximity. In some embodiment, this proximity monitoring is performed by the Proximity Monitoring module 120 in FIG. 1.

Gait Detection: As the proximity feature relies on the dynamic reflection of WiFi signals, it is susceptible to being impacted by the intensity of motion, and smaller movements in the same target area may result in smaller feature values compared to larger movements. If a user enters the target area and remains still, the proximity features will not indicate the nearby motion in a consistent way. Since the change of proximity involves walking motion, gait information can be used to determine if a human subject has entered or left a specific area. In some embodiment, this gait detection is performed by the Gait Detection module 130 in FIG. 1.

Figure 3:
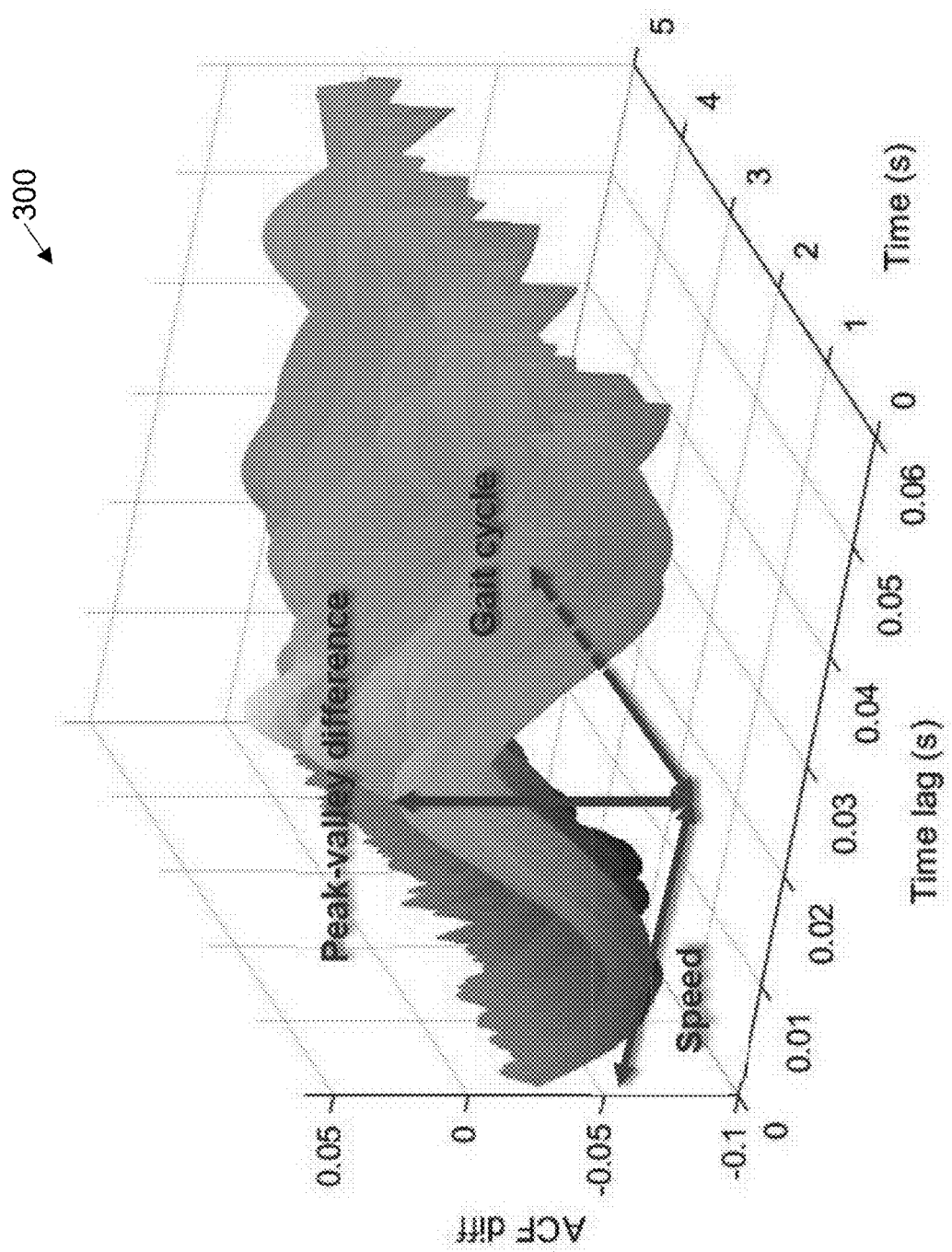
FIG. 3 shows gait information from a differential of autocorrelation function (ACF), according to some embodiments of the present disclosure.

The existence of human gait can be detected by identifying gait cycles. A gait cycle is a walking pattern, starting from the moment one foot striking the ground to the moment that same foot strikes the ground again. It can be identified by the speed during walking, because each step has a speed peak during mid-stance, followed by a decrease in speed as the foot leaves the ground, and an increase in speed during the swing phase until the foot strikes the ground again. The walking speed can be reliably estimated from a statistical model, based on the ACF of CSI power as $$R_G(f, \Delta t) = g(f) J_0(kV\Delta t) \tag{5}$$

where $J_0$ is the zero-order Bessel function, k is the wave number, f is the subcarrier frequency and g(f) is gain coefficient on that subcarrier. Then, one can further define a gait score which reflects the probability of gait existence, based on the following consideration as illustrated in FIG. 3, which shows gait information 300 from a differential of autocorrelation function (ACF). First, in the time domain, the fluctuation of the estimated speed can be used to infer the human gait cycle. Second, the confidence of the gait speed can be extracted based on the distribution of normal human walking. Third, the significance of the peak and valley also indicates the confidence of the speed estimation. Therefore, the disclosed system uses the peak-valley difference as the weights to calculate the gait score.

In some embodiments, the gait score is formulated as $$F_g = w^* p(v) \mathbb{1}_{(0,\infty)}(w) \mathbb{1}_{[0.5,1.5]}(c) \tag{6}$$

where w is the difference between the prominence of speed peak and valley; w equals zero if there is no peak or valley detected; c is the number of gait cycle per second, and is confined to be between 0.5 and 1.5 for a normal walking; p(v) is the probability that the observed speed would have occurred if the speed is from human walking. Since the pedestrian walking speed follows a normal distribution with an estimated mean of 1.34 m/s and a standard deviation of 0.37 m/s, one can calculate the probability as:

$$p(v) = 1 - 2\left|\Phi\left(\frac{v-1.34}{0.37}\right) - 0.5\right| \text{ where } \Phi\left(\frac{v-1.34}{0.37}\right) \tag{7}$$

is the cumulative distribution function (CDF) of a non-standard normal distribution with mean 1.34 and standard deviation 0.37.

Figure 4:
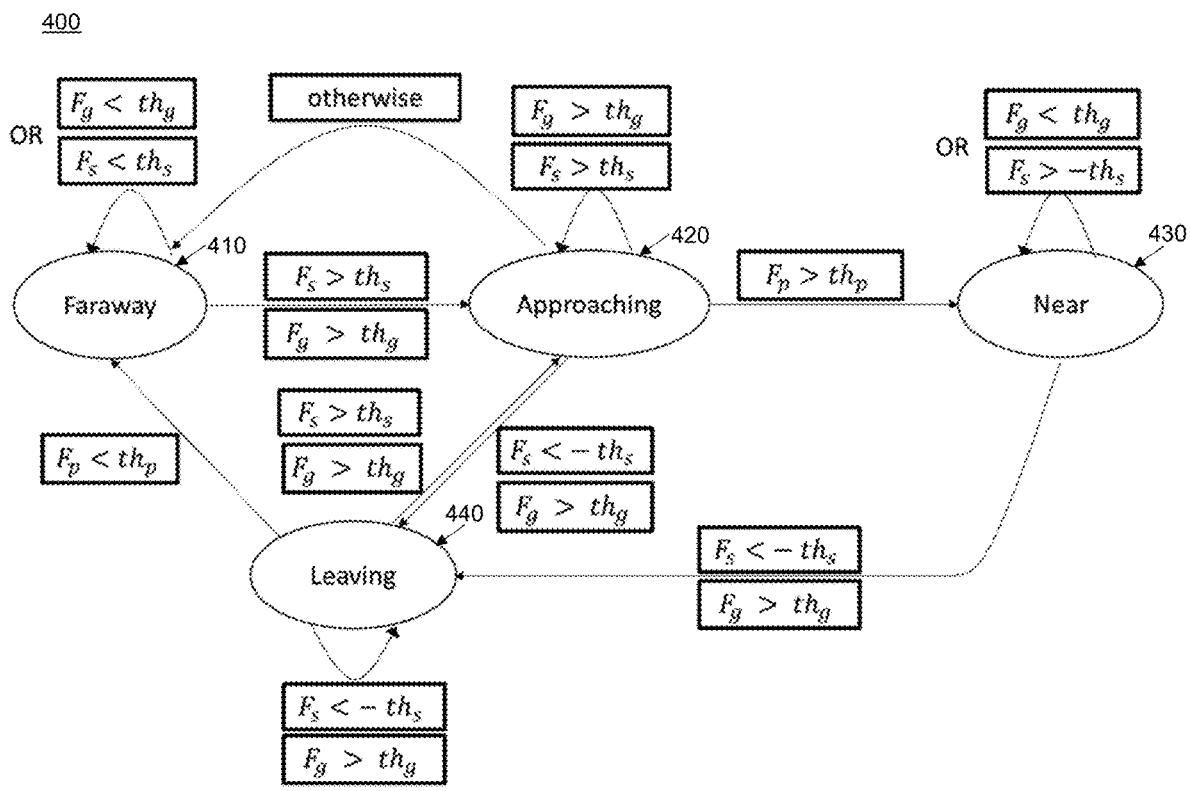
FIG. 4 illustrates a finite-state-machine (FSM) for proximity monitoring, according to some embodiments of the present disclosure.

State Transition: The combination of both proximity features and gait information allows one to infer whether a moving human has entered the proximate area. To this end, the present teaching discloses a finite-state-machine (FSM) 400 including multiple states as shown in FIG. 4. By monitoring the trend of the proximity feature and gait existence, the FSM 400 enhances the accuracy of the inference process. It contains four states: a Faraway state 410, an Approaching state 420, a Near state 430, and a Leaving state 440.

The Faraway state 410 is the system's default state, in which the detector or the system 100 continuously monitors the ACF spectrum and calculates the proximity feature while outputting the possibility of detecting human gait. If the system detects an increase in proximity feature along with human gait, it transitions to the Approaching state 420. Otherwise, it remains in the Faraway state 410.

The FSM 400 enters the Approaching state 420 with the presence of human gait and an increasing in the proximity feature. The system keeps checking the proximity feature and gait. If the proximity feature reaches a threshold indicating proximity, the FSM 400 switches to the Near state 430. Otherwise, it remains in the Approaching state 420. In the absence of gait detection and the high proximity feature, the FSM 400 switches back to the Faraway state 410.

In the Near state 430, the human subject has entered a pre-defined proximate area, irrespective of the intensity of motion. Based on an assumption that the human will leave only by walking, if the system detects a decrease in proximity feature and human gait simultaneously, then the FSM 400 transitions to the Leaving state 440. Otherwise, the system remains in the Near state 430.

The Leaving state 440 denotes that the human is walking out of the proximate area. When the proximity feature decreases to a threshold indicating departure, the FSM 400 switches back to the default initialization state, which is the Faraway state 410 in this example. In some embodiments, all of the state transitions are performed by the State Transition module 140 in FIG. 1.

An accurate gait extraction from CSI requires a high sounding rate while the proximity feature does not. Therefore, a downsampling is performed on the received CSI before the proximity monitoring, but not before the gait detection, as shown in FIG. 1. This downsampling serves to reduce the computational overhead, making the system more practical for real-time applications.

Figure 5:
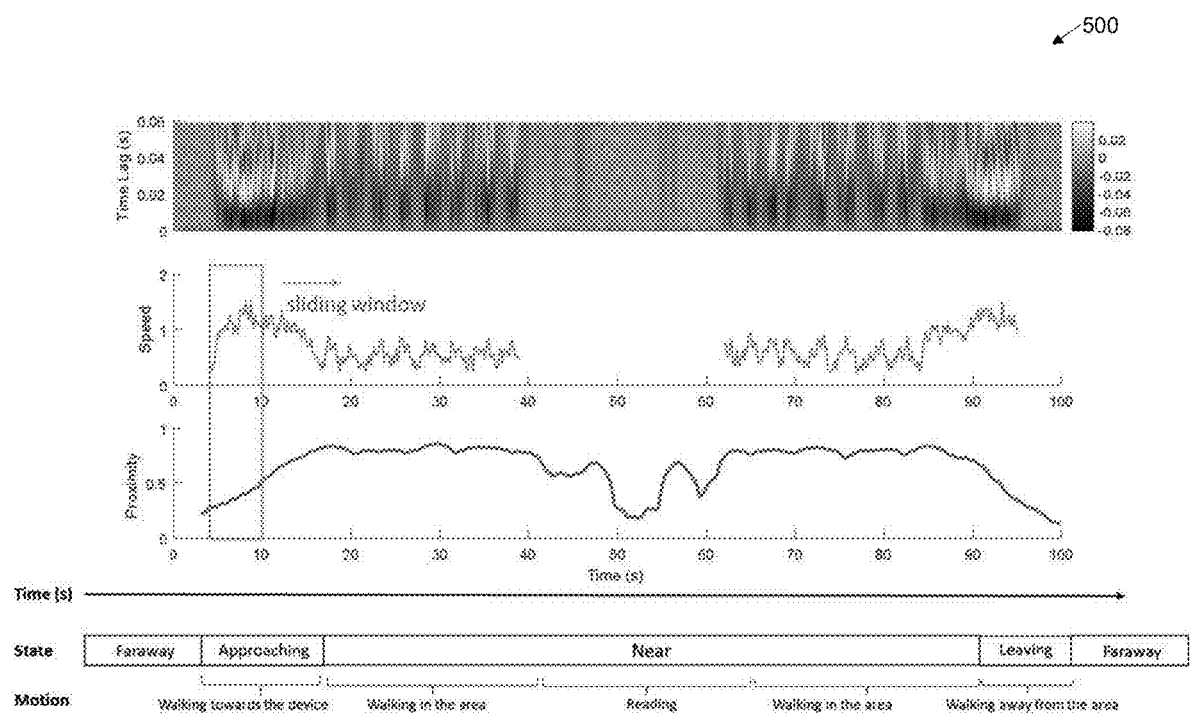
FIG. 5 illustrates a process including different states regarding proximity of an object to a target, according to some embodiments of the present disclosure.

FIG. 5 provides an illustrative example 500 of how the extracted features evolve over time as a person approaches a device. Initially, as the person walks towards the device, noticeable fluctuations appear in the ACF spectrum, as well as in the estimated speed (v), accompanied by an increasing value in the proximity feature $F_p$. Once the person enters the target area, $F_p$ remains high, but it drops if the person engages in small motions (e.g. reading). Despite the drop in $F_p$, the state machine remains in the Near state because there is no observed gait pattern. Only upon a gait pattern detection and a decrease in $F_p$, the Leaving state is triggered. The integration of gait features with proximity features within the state machine effectively enhances system robustness when the human is in a quasi-static status.

In some embodiments, one can build a pair of Tx-Rx prototypes equipped with off-the-shelf WiFi cards to implement the disclosed proximity detector. Each prototype has 2 omni-directional antennas. The center frequency is configured as 5.18 GHz with a bandwidth of 40 MHz. The sounding rate is set to be 1500 Hz and downsampled to 30 Hz for the proximity monitoring module for lowering computation complexity.

Figure 6A:
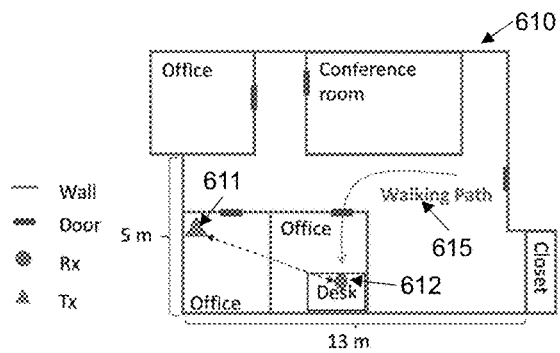
FIGS. 6A-6D show exemplary environments and deployments for wireless proximity detection, according to some embodiments of the present disclosure.

To evaluate the performance of the disclosed system, one can conduct extensive experiments in diverse environments, including two typical office environments and two home environments (one apartment and one single-family house), as depicted in FIGS. 6A-6D. FIG. 6A shows a first office environment (Office 1 environment) 610 for wireless proximity detection. In the Office 1 environment 610, a person may move across offices with time along a walking path 615. While a transmitter (Tx) 611 is placed in a corner of one office, a receiver (Rx) 612 is placed at a desk of another office. In some embodiments, the Rx 612 can receive a wireless signal transmitted by the Tx 611, via a multipath channel. The wireless signal is impacted by motions of the person, while the person is moving in any office of the Office 1 environment 610. The disclosed system can compute CSI time series based on the received wireless signals, and extract different features from the CSI time series, including gait information and proximity features.

Figure 6B:
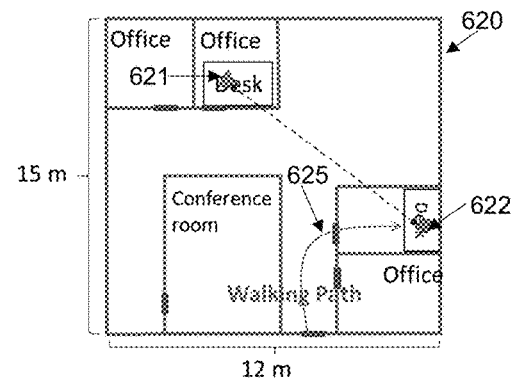

FIG. 6B shows a second office environment (Office 2 environment) 620 for wireless proximity detection. In the Office 2 environment 620, a person may move across offices with time along a walking path 625. While a Tx 621 is placed in on a desk of one office, a Rx 622 is placed at a desk of another office. In some embodiments, the Tx 621 and the Rx 622 work similarly to the Tx 611 and the Rx 612, respectively, to capture CSI or channel information time series, for proximity detection.

Figure 6C:
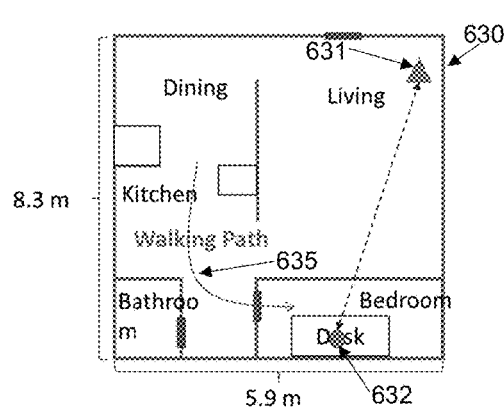

FIG. 6C shows a first home environment (Home 1 environment) 630 for wireless proximity detection. In the Home 1 environment 630, a person may move across rooms with time along a walking path 635. While a Tx 631 is placed in a living room, a Rx 632 is placed in a bedroom. In some embodiments, the Tx 631 and the Rx 632 work similarly to the Tx 611 and the Rx 612, respectively, to capture CSI or channel information time series, for proximity detection.

Figure 6D:
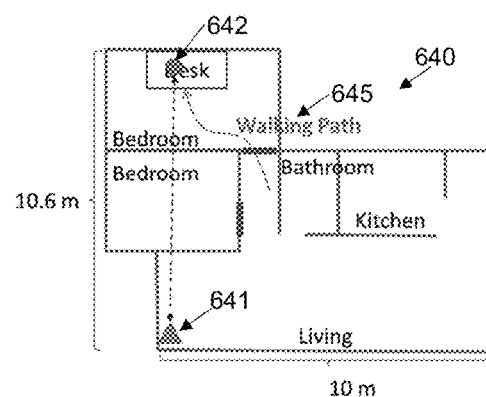

FIG. 6D shows a second home environment (Home 2 environment) 640 for wireless proximity detection. In the Home 2 environment 640, a person may move across rooms with time along a walking path 645. While a Tx 641 is placed in a corner of a living room, a Rx 642 is placed on a desk in a bedroom. In some embodiments, the Tx 641 and the Rx 642 work similarly to the Tx 611 and the Rx 612, respectively, to capture CSI or channel information time series, for proximity detection.

During the experiments in each environment, participants walk toward a target device and stay in the immediate vicinity of the target device with minor movements (e.g. sitting and reading). Afterwards, they return to the starting point. The sequence of the above-mentioned motion, which can last for a minute or longer, constitutes an "event sample". To assess the false alarm rate, one can maintain the devices at the same fixed locations while allowing participants to freely move away from the devices. The ground truth is recorded by timestamp cameras.

The following metrics can be used to evaluate the performance of the disclosed system. FIGS. 7A-7C show some exemplary evaluation metrics for wireless proximity detection.

The first metric is Instance-based accuracy (IA). The IA measures the accuracy of detecting the aforementioned "event samples" involving the sequence of an object approaching, entering the proximate area, and leaving it. In some embodiments, it is calculated as the ratio of system detections to the ground truth occurrences of this sequence. In mathematical terms, one can compute IA as $$IA = \frac{N_{sys}}{N_{GT}} \tag{8}$$

where $N_{GT}$ represents the actual number of occurrences of the event according to the ground truth, while $N_{sys}$ represents the number of detections made by the system for the same event as FIG. 7A indicates.

The second metric is Duration-based accuracy (DA). In this example, one can define the proximate area as an area within 1.5 meters of the target device. Using a timestamp camera and the labels on the ground, one can determine the actual duration from a person entering the target area until he/she leaves the area, thereby obtaining a duration-based metric. The duration-based accuracy can be mathematically formulated as:

$$DA = \left\lceil \frac{T_{sys}}{T_{GT}} \right\rceil^1 \tag{9}$$

where $T_{sys}$ is the duration of system output staying at the Near state while $T_{GT}$ is the duration of the true Near state. FIG. 7A illustrates the calculation of DA. In some embodiments, the DA can only be calculated on the samples that have both successfully detected Approaching and Leaving states.

The third metric is Responsiveness. As illustrated by FIG. 7B, the responsiveness of the system can be evaluated by measuring the time difference between the system detection and the ground truth, i.e., $$\tau = t_{GT} - t_{sys} \tag{10}$$

where $t_{GT}$ is the timestamp for the occurrence of the real Near state, while $t_{sys}$ is the timestamp of the first system detection.

The fourth metric is False alarm (FA) rate. As illustrated by FIG. 7C, when the disclosed system mistakenly detects a subject enters the target area, a false alarm happens. The false alarm rate, also instance-based, can be defined as $$FA = \frac{N_{sys}^{FA}}{N_{GT}^{empty}} \tag{11}$$

where $N_{sys}^{FA}$ is the number of false detection events, and the denominator $N_{GT}^{empty}$ corresponds to the total number of instances where the target area is empty.

The performance of the disclosed system tested in the four environments shown FIGS. 6A-6D is shown in Table I below. The parameters are determined empirically and universal for all environments. The overall detection rate and false alarm rate are 92.5% and 1.12%, respectively. As shown in Table I, the results demonstrate a high detection rate of >97% and a low false alarm rate of <3% in all environments, highlighting the effectiveness of the disclosed approach in accurately detecting proximity in various scenarios. In addition, once a proximity instance is detected, the system also exhibits a near-perfect DA of 98.86%, aligning consistently with the ground truth. The overall detection delay of 0.825 s also demonstrates a fast responsive system detection.

TABLE I

| Environment | Samples$_{IA}$ | IA | DA | $\tau$ | Samples$_{FA}$ | FA |
|---|---|---|---|---|---|---|
| Office 1 | 83 | 91.69% | 98.4% | 0.65 s | 72 | 1.39% |
| Office 2 | 46 | 93.5% | 97.2% | 0.71 s | 62 | 0.0% |

TABLE I-continued

| Environment | Samples$_{IA}$ | IA | DA | τ | Samples$_{FA}$ | FA |
|---|---|---|---|---|---|---|
| Home 1 | 56 | 92.9% | 99.5% | 1.12 s | 60 | 0.0% |
| Home 2 | 68 | 92.6% | 100% | 0.87 s | 75 | 2.67% |
| Overall | 253 | 92.5% | 98.86% | 0.825 s | 269 | 1.12% |

In some embodiments, the tested walking paths are longer than 5 meters to ensure a stable walking period. To evaluate how the length of the walking path affects the performance, one can collect more data with different walking path lengths in the Office 1 environment 610, e.g. including 3 meters, 6 meters and 9 meters by adjusting the starting points. The accuracy result indicates that the shorter the path length, the lower the IA, as the gait pattern may not be stable enough during the transition period. Since the DA is calculated based on the successful recognition of the approaching and leaving states, when the approaching and leaving states are identified, the DA value approaches near 100%.

Figure 8:
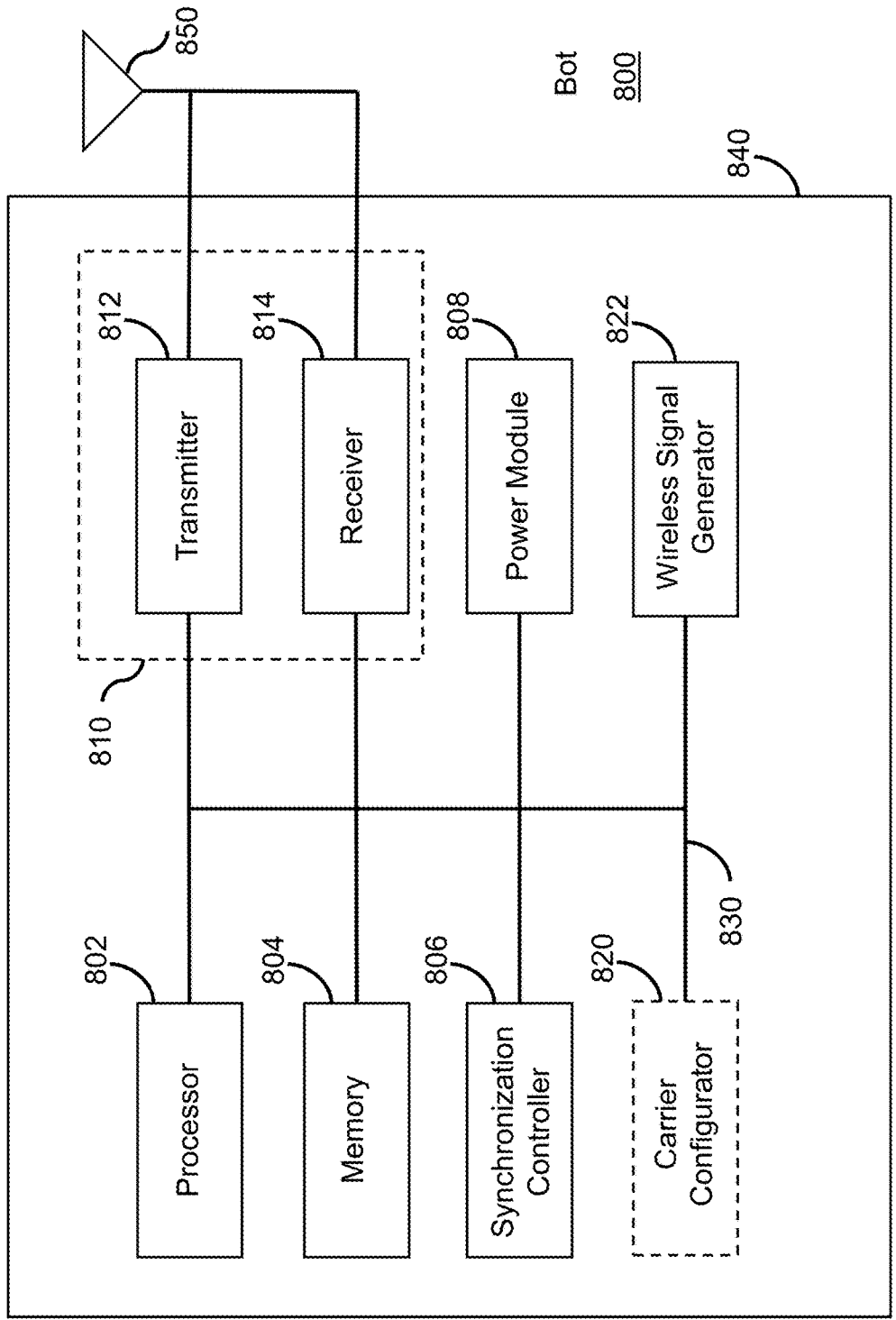
FIG. 8 illustrates an exemplary block diagram of a first wireless device of a system for wireless proximity detection, according to some embodiments of the present disclosure.

FIG. 8 illustrates an exemplary block diagram of a first wireless device, e.g. a Bot 800, of a system for wireless proximity detection, according to one embodiment of the present teaching. The Bot 800 is an example of a device that can be configured to implement the various methods described herein. As shown in FIG. 8, the Bot 800 includes a housing 840 containing a processor 802, a memory 804, a transceiver 810 comprising a transmitter 812 and receiver 814, a synchronization controller 806, a power module 808, an optional carrier configurator 820 and a wireless signal generator 822.

In this embodiment, the processor 802 controls the general operation of the Bot 800 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 804, which can include both read-only memory (ROM) and random access memory (RAM), can provide instructions and data to the processor 802. A portion of the memory 804 can also include non-volatile random access memory (NVRAM). The processor 802 typically performs logical and arithmetic operations based on program instructions stored within the memory 804. The instructions (a.k.a., software) stored in the memory 804 can be executed by the processor 802 to perform the methods described herein. The processor 802 and the memory 804 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 810, which includes the transmitter 812 and receiver 814, allows the Bot 800 to transmit and receive data to and from a remote device (e.g., an Origin or another Bot). An antenna 850 is typically attached to the housing 840 and electrically coupled to the transceiver 810. In various embodiments, the Bot 800 includes (not shown) multiple transmitters, multiple receivers, and multiple transceivers. In one embodiment, the antenna 850 is replaced with a multi-antenna array 850 that can form a plurality of beams each of which points in a distinct direction. The transmitter 812 can be configured to wirelessly transmit signals having different types or functions, such signals being generated by the processor 802. Similarly, the receiver 814 is configured to receive wireless signals having different types or functions, and the processor 802 is configured to process signals of a plurality of different types.

The Bot 800 in this example may serve as a Bot or Type1 device, e.g. Tx 611, 621, 631, 641, or any other transmitter in FIGS. 1-7, for wireless proximity detection in a venue. For example, the wireless signal generator 822 may generate and transmit, via the transmitter 812, a wireless signal through a wireless multipath channel impacted by a motion of an object in the venue. The wireless signal carries information of the channel. Because the channel was impacted by the motion, the channel information includes motion information that can represent the motion of the object. As such, the motion can be indicated and detected based on the wireless signal. The generation of the wireless signal at the wireless signal generator 822 may be based on a request for motion detection from another device, e.g. an Origin, or based on a system pre-configuration. That is, the Bot 800 may or may not know that the wireless signal transmitted will be used to detect motion.

The synchronization controller 806 in this example may be configured to control the operations of the Bot 800 to be synchronized or un-synchronized with another device, e.g. an Origin or another Bot. In one embodiment, the synchronization controller 806 may control the Bot 800 to be synchronized with an Origin that receives the wireless signal transmitted by the Bot 800. In another embodiment, the synchronization controller 806 may control the Bot 800 to transmit the wireless signal asynchronously with other Bots. In another embodiment, each of the Bot 800 and other Bots may transmit the wireless signals individually and asynchronously.

The carrier configurator 820 is an optional component in Bot 800 to configure transmission resources, e.g. time and carrier, for transmitting the wireless signal generated by the wireless signal generator 822. In one embodiment, each CI of the time series of CI has one or more components each corresponding to a carrier or sub-carrier of the transmission of the wireless signal. The detection of the motion may be based on motion detections on any one or any combination of the components.

The power module 808 can include a power source such as one or more batteries, and a power regulator, to provide regulated power to each of the above-described modules in FIG. 8. In some embodiments, if the Bot 800 is coupled to a dedicated external power source (e.g., a wall electrical outlet), the power module 808 can include a transformer and a power regulator.

The various modules discussed above are coupled together by a bus system 830. The bus system 830 can include a data bus and, for example, a power bus, a control signal bus, and/or a status signal bus in addition to the data bus. It is understood that the modules of the Bot 800 can be operatively coupled to one another using any suitable techniques and mediums.

Although a number of separate modules or components are illustrated in FIG. 8, persons of ordinary skill in the art will understand that one or more of the modules can be combined or commonly implemented. For example, the processor 802 can implement not only the functionality described above with respect to the processor 802, but also implement the functionality described above with respect to the wireless signal generator 822. Conversely, each of the modules illustrated in FIG. 8 can be implemented using a plurality of separate components or elements.

Figure 9:
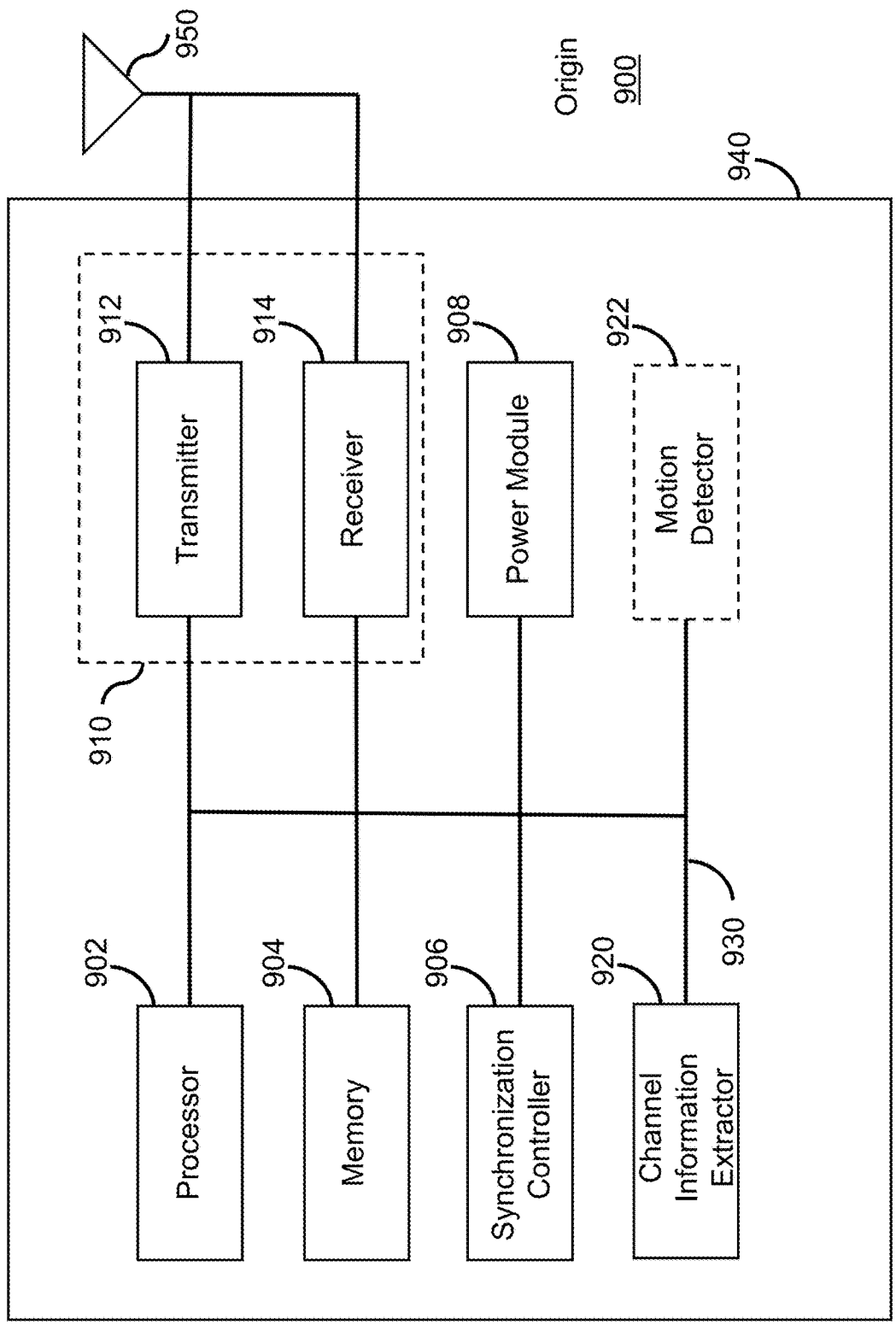
FIG. 9 illustrates an exemplary block diagram of a second wireless device of a system for wireless proximity detection, according to some embodiments of the present disclosure.

FIG. 9 illustrates an exemplary block diagram of a second wireless device, e.g. an Origin 900, of a system for wireless proximity detection, according to one embodiment of the present teaching. The Origin 900 is an example of a device that can be configured to implement the various methods described herein. The Origin 900 in this example may serve as an Origin or Type2 device, e.g. Rx 612, 622, 632, 642 or any other receiver in FIGS. 1-7, for wireless proximity detection in a venue. As shown in FIG. 9, the Origin 900 includes a housing 940 containing a processor 902, a memory 904, a transceiver 910 comprising a transmitter 912 and a receiver 914, a power module 908, a synchronization controller 906, a channel information extractor 920, and an optional motion detector 922.

In this embodiment, the processor 902, the memory 904, the transceiver 910 and the power module 908 work similarly to the processor 802, the memory 804, the transceiver 810 and the power module 808 in the Bot 800. An antenna 950 or a multi-antenna array 950 is typically attached to the housing 940 and electrically coupled to the transceiver 910.

The Origin 900 may be a second wireless device that has a different type from that of the first wireless device (e.g. the Bot 800). In particular, the channel information extractor 920 in the Origin 900 is configured for receiving the wireless signal through the wireless multipath channel impacted by the motion of the object in the venue, and obtaining a time series of channel information (CI) of the wireless multipath channel based on the wireless signal. The channel information extractor 920 may send the extracted CI to the optional motion detector 922 or to a motion detector outside the Origin 900 for detecting object motion in the venue.

The motion detector 922 is an optional component in the Origin 900. In one embodiment, it is within the Origin 900 as shown in FIG. 9. In another embodiment, it is outside the Origin 900 and in another device, which may be a Bot, another Origin, a cloud server, a fog server, a local server, and an edge server. The optional motion detector 922 may be configured for detecting the motion of the object in the venue based on motion information related to the motion of the object. The motion information associated with the first and second wireless devices is computed based on the time series of CI by the motion detector 922 or another motion detector outside the Origin 900.

The synchronization controller 906 in this example may be configured to control the operations of the Origin 900 to be synchronized or un-synchronized with another device, e.g. a Bot, another Origin, or an independent motion detector. In one embodiment, the synchronization controller 906 may control the Origin 900 to be synchronized with a Bot that transmits a wireless signal. In another embodiment, the synchronization controller 906 may control the Origin 900 to receive the wireless signal asynchronously with other Origins. In another embodiment, each of the Origin 900 and other Origins may receive the wireless signals individually and asynchronously. In one embodiment, the optional motion detector 922 or a motion detector outside the Origin 900 is configured for asynchronously computing respective heterogeneous motion information related to the motion of the object based on the respective time series of CI.

The various modules discussed above are coupled together by a bus system 930. The bus system 930 can include a data bus and, for example, a power bus, a control signal bus, and/or a status signal bus in addition to the data bus. It is understood that the modules of the Origin 900 can be operatively coupled to one another using any suitable techniques and mediums.

Although a number of separate modules or components are illustrated in FIG. 9, persons of ordinary skill in the art will understand that one or more of the modules can be combined or commonly implemented. For example, the processor 902 can implement not only the functionality described above with respect to the processor 902, but also implement the functionality described above with respect to the channel information extractor 920. Conversely, each of the modules illustrated in FIG. 9 can be implemented using a plurality of separate components or elements.

In one embodiment, in addition to the Bot 800 and the Origin 900, the system may also comprise: an assistance device, a third wireless device, e.g. another Bot, configured for transmitting an additional heterogeneous wireless signal through an additional wireless multipath channel impacted by the motion of the object in the venue, or a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 922 or a motion detector outside the Origin 900 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

Figure 10:
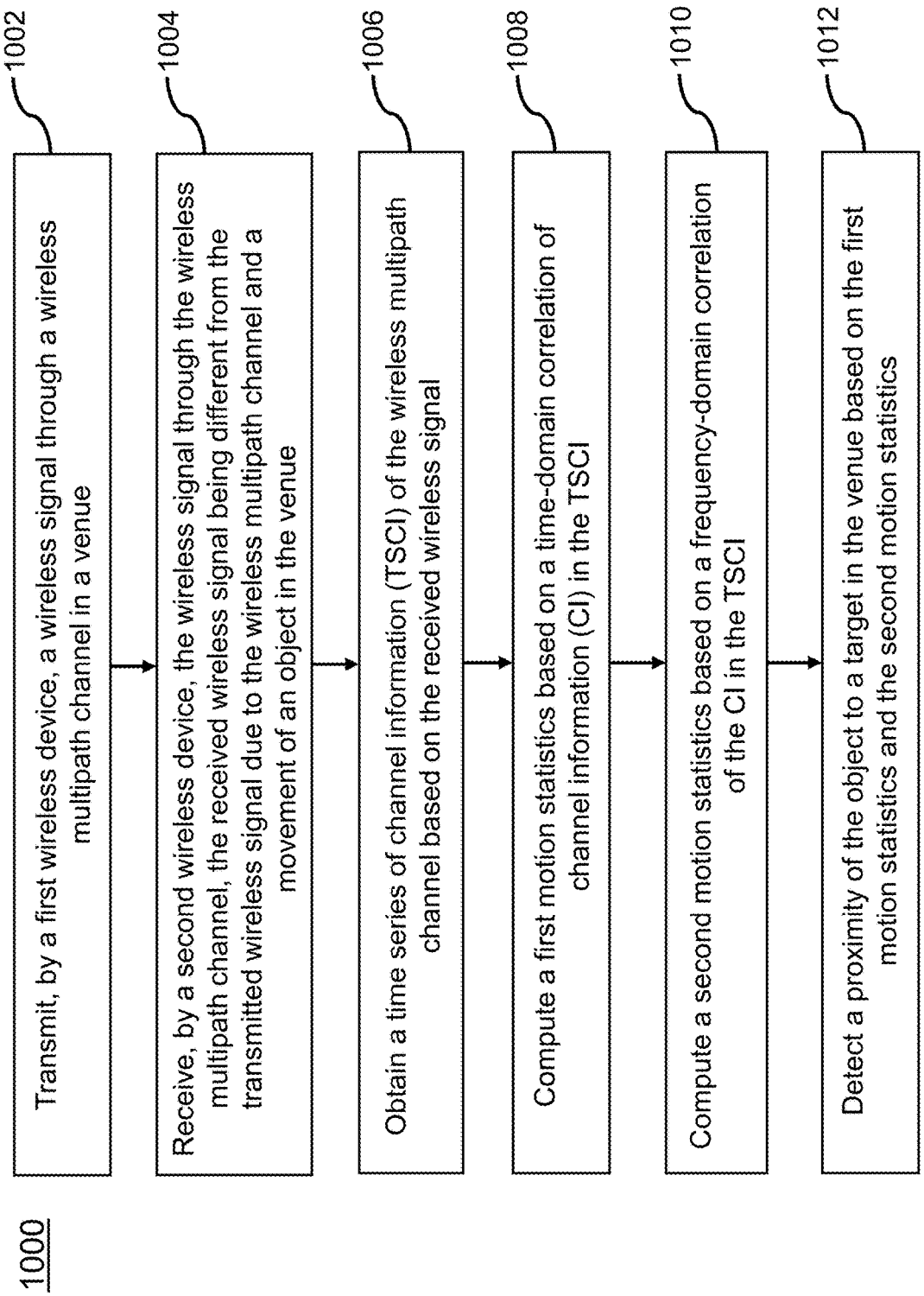
FIG. 10 illustrates a flow chart of an exemplary method for wireless proximity detection, according to some embodiments of the present disclosure.

FIG. 10 illustrates a flow chart of an exemplary method 1000 for wireless proximity detection, according to some embodiments of the present disclosure. In various embodiments, the method 1000 can be performed by the systems disclosed above. At operation 1002, a wireless signal is transmitted by a first wireless device through a wireless multipath channel in a venue. At operation 1004, the wireless signal is received by a second wireless device through the wireless multipath channel. The received wireless signal is different from the transmitted wireless signal due to the wireless multipath channel and a movement of an object in the venue. At operation 1006, a time series of channel information (TSCI) of the wireless multipath channel is obtained based on the received wireless signal. At operation 1008, a first motion statistics is computed based on a time-domain correlation of channel information (CI) in the TSCI. At operation 1010, a second motion statistics is computed based on a frequency-domain correlation of the CI in the TSCI. At operation 1012, a proximity of the object to a target in the venue is detected based on the first motion statistics and the second motion statistics.

Figure 11:
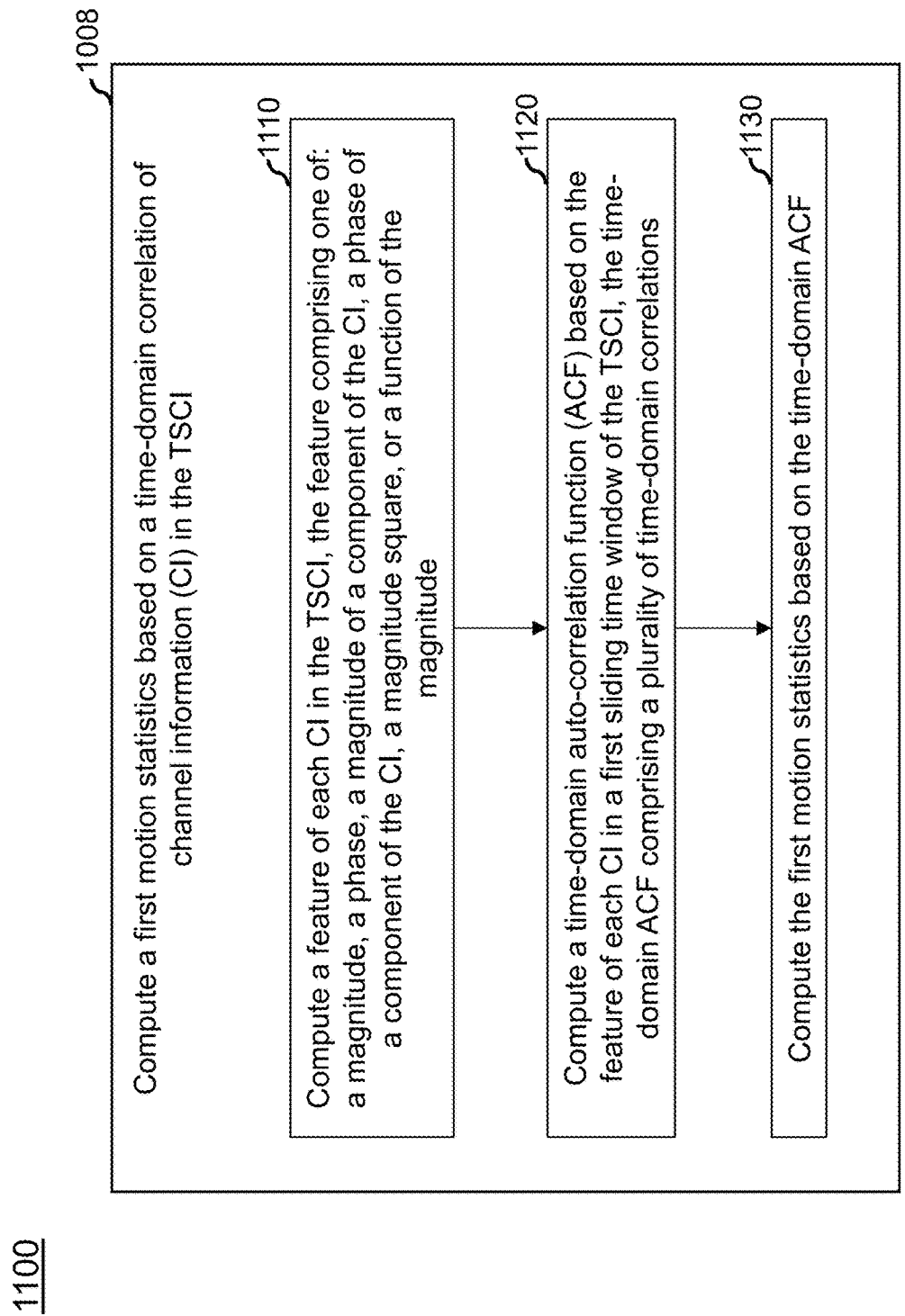
FIG. 11 illustrates a flow chart showing detailed operations for wireless proximity detection, according to some embodiments of the present disclosure.

FIG. 11 illustrates a flow chart showing detailed operations 1100 for wireless proximity detection, according to some embodiments of the present disclosure. In some embodiments, the operations 1100 may be performed as part of the operation 1008 in FIG. 10. At operation 1110, a feature of each CI in the TSCI is computed. The feature comprises one of: a magnitude, a phase, a magnitude of a component of the CI, a phase of a component of the CI, a magnitude square, or a function of the magnitude. At operation 1120, a time-domain auto-correlation function (ACF) is computed based on the feature of each CI in a first sliding time window of the TSCI. The time-domain ACF comprises a plurality of time-domain correlations. At operation 1130, the first motion statistics is computed based on the time-domain ACF. In some embodiments, the second motion statistics in operation 1010 in FIG. 10 can be computed similarly based on a frequency-domain ACF.

The order of the operations in any one of the drawings may be changed according to various embodiments of the present teaching.

In some embodiments of the present teaching, the proximity of an object (e.g. a human) to a target in a venue may be computed/determined/detected based on wireless channel information (e.g. CI, CSI, CIR, CFR) obtained from wireless signals (e.g. WiFi signal, IEEE 802.11 signal, 802.11bf signal, mobile communication/4G/5G/6G/7G/8G/9G/10G signal, UWB, wireless sounding signals, standard compliant signals, NDP, NDPA, TF) communicated between a Type1 (TX) wireless device and a Type2 (RX) wireless device.

A target (e.g. a floor, a room, a region, an area, a location, a device, an appliance, a second object) may be determined in a venue. The target may be near one of the Type1 device or the Type2 device. The target may be one of the Type1 device or the Type2 device. The target may be a smart/WiFi-enabled home appliance/furniture/fixture such as TV, speaker, plug, lighting/light, clock, security camera, door bell, vacuum cleaner, etc.

The proximity (e.g. comprising proximity status/quantity/tag/state/class/indicator/score) may be computed based on both time-domain correlation and frequency-domain correlation of CI of the time series of CI (TSCI). A first motion statistics, e.g. gait score, $F\_g$ in Eqn. (6), may be computed based on time-domain correlation of the CI in a sliding time window. A second motion statistics, e.g. $F\_p$ in Eqn. (4), may be computed based on frequency-domain correlation of CI of the TSCI. The $F\_s$ may be a slope (first derivative) of the second motion statistics within a certain time window. A positive $F\_s$ may suggest the second motion statistics (or its magnitude) is increasing over time, while a negative $F\_s$ may mean decreasing in time. A large positive $F\_s$ may suggest the second motion statistics increasing at a fast pace while a small positive $F\_s$ may suggest increasing slowly.

The first motion statistics (MS) may be computed for a plurality of time instances, forming a first time trend. The first MS may be computed at regular time intervals at a first (sampling) frequency/rate, which may be 0.0001/0.001/0.01/0.1/1/10/100/1000/10000/100000 Hz or other values. The first (sampling) frequency/rate may be changed over time.

The second motion statistics may be computed for a plurality of time instances, forming a second time trend. The second MS may be computed at regular time intervals at a second (sampling) frequency/rate, which may be 0.0001/0.001/0.01/0.1/1/10/100/1000/10000/100000 Hz, or other values. The second sampling frequency/rate may be same as/different from first sampling rate. The second sampling rate may be changed over time.

The proximity (e.g. one of four states of a finite state machine) may be computed for a plurality of time instances, forming a third time trend. The proximity may be computed at regular time intervals at a third (sampling) frequency/rate, which may be 0.0001/0.001/0.01/0.1/1/10/100/1000/10000/100000 Hz, or other values. The third sampling rate may be same as/different from the first or second sampling rate. The third sampling rate may be changed over time.

The first MS, the second MS and the proximity may be computed repeatedly, each at respective timing. For example, they may be computed periodically, each at respective rate.

The TSCI may be sampled at a high sampling frequency (e.g. 10000 Hz). One of the MS (e.g. the first MS) and the associated (time-domain or frequency-domain) correlation of CI may be computed based on the whole TSCI at the high sampling frequency. The TSCI may be resampled/subsampled to a lower sampling frequency (e.g. 100 Hz). The other one of the MS (e.g. the second MS) and the associated (frequency-domain or time-domain) correlation of CI may be computed based on the resampled/subsampled CI of the TSCI.

The proximity may be computed at a rate (e.g. 1 Hz) less than or equal to the lower sampling frequency. Both the first MS and the second MS may be computed when (or slightly before) the proximity needs to be computed (e.g. at 1 Hz). In such case, the first MS may be computed based on a first time window (e.g. 0.1 second) of CI of the TSCI, while the second may be computed based on a second time window (e.g. 1 second) of the CI resampled/subsampled from the TSCI.

The first motion statistics (MS) may be the gait score as defined in Eqn. (6). The first MS (e.g. gait score) may be computed for a sliding time window, based on a time-domain autocorrelation function computed using CI in the sliding time window of the TSCI. Feature of each CI (CI-feature) may be obtained. The CI-feature may be a magnitude, magnitude square, a function of magnitude, or phase. For two adjacent CI, the correlation between them may simply be correlation of the two corresponding CI-features. When each CI has multiple components (e.g. CSI, CIR, CFR), component-feature (e.g. magnitude, magnitude square, function of magnitude, or phase) may be obtained for each component. The corresponding CI-feature may be a vector of component-features. For two adjacent CI, the correlation between them may be an inner-product of the two corresponding vectors of component-features. The time-domain ACF may be computed based on CI-feature of the CI in the sliding time window.

At least one characteristic point or ACF-feature (e.g. local/global maxima/peaks, local/global minima, zero-crossings, mean-crossing, inflection points) may be computed/identified/found for either the time-domain ACF or a function of the time-domain ACF (e.g. first derivative/slope of the time-domain ACF). The first MS may be computed based on the at least one characteristic point (e.g. first local max, first local min)

There may be two characteristic points (e.g. first local max+first local min, first local max+second local min, first local min+second local max, second local min+second local max, first local max+first zero crossing, first local min+first zero crossing, first local max+first inflection point, first local min+first inflection point, first zero-cross+first inflection point, etc). The first MS may be computed based on a function (e.g. sum, difference, weighted sum, weighted difference, product, quotient, weighted product, weighted quotient, function of function, sum of logarithm) of the two characteristic points.

There may be multiple characteristic points (e.g. first local max+first local min+second local max+second local min, first local max+first zero-cross+first local min, first local max+first inflection point+first local min, etc). The first MS may be computed based on a function (e.g. sum, difference, weighted sum, weighted difference, product, quotient, weighted product, weighted quotient, function of function, sum of logarithm) of the multiple characteristic points.

A special case is that two characteristic points comprise a local max and a local min (e.g. first local max, first local min). The first MS may be computed based on a difference of the local max and the local min. The "difference" is "w" in Eqn. (6).

Sometimes, the local max and/or local min cannot be accurately determined, the difference may then be defined/computed as zero.

An STI (e.g. speed) may be computed based on the two characteristic points.

A probability score, e.g. "p(v)" in Eqn. (6), may be computed for the STI, based on a pdf. The pdf may be provided/computed/trained in a training phase/session.

A pdf may be used to compute the probability score. The pdf may be a mixture of pdf with at least one being generalized Gaussian (e.g. Laplacian if order=1, Gaussian if order=2). The generalized Gaussian may be Gaussian. The mixture of pdf may be Gaussian. A mixture of pdf is a pdf with the form of: $w\_1*pdf\ 1+w\_2*pdf\_2+ \ldots +w\_n*pdf\ n$, where $w\_i>=0$, $w\_1+w\_2+ \ldots +w\_n=1$. Each pdf_i is a pdf, i.e. non-negative with an area (integration) equal to 1. In other words, a mixture of pdf is a weighted sum of pdf, with non-negative weights, and the weights adding up to one.

The first motion statistic may be monotonic non-decreasing (e.g. increasing) w.r.t. probability score or monotonic non-decreasing (e.g. increasing) w.r.t. the difference between the two characteristic points.

A sliding time window for computing the frequency-domain correlation is different from the sliding time window for computing the time-domain correlation.

Each CI (e.g. CI, CSI, CIR, CFR) may have a representation (e.g. frequency representation, or a transformation to the frequency representation) comprising multiple frequency components, each with a corresponding frequency index.

A number of (component-dependent, or frequency-dependent) k-component correlation may be computed for each component. The k-component correlation for the $n^{th}$ component may be a correlation between the $n^{th}$ component and the $(n+k)^{th}$ component (or the $(n-k)^{th}$ component). When k=1, immediately adjacent components, e.g. $f\_n$, and $f\_{n+1}$ in Eqn. (4), may be used to compute the correlation (e.g. $\rho\_G(f\_n, f\_{n+1})$). The frequency-domain correlation may be computed as an aggregate (e.g. average) of the k-component correlation over all the n components.

A feature may be computed for each component of the CI. The k-component correlation for the $n^{th}$ component may be/comprise a correlation between the feature of $n^{th}$ component and the feature of the $(n+k)^{th}$ component (or the $(n-k)^{th}$ component).

More than one plurality of k-component correlation may be computed, each plurality associated with a respective value of k. For example, the associated values of k may comprise k1, k2, k3, . . . . For each value of k (e.g. k1, k2, k3, . . . ), at least one aggregate may be computed. For example, for k=k1, one aggregate may be arithmetic mean and another aggregate may be geometric mean. For k=k2, one aggregate may be weighted average, another aggregate may be trimmed mean, and yet another aggregate may be harmonic mean. The frequency-domain correlation may be based on some aggregate of all the aggregates for all the values of k.

The proximity detection of the object relative to (or with respect to) the target may operate according to a finite state machine (FSM). There may be four states in the FSM: "far-away", "approaching", "near" and/or "leaving". An initial state may be determined to be one of the four states. At any time t, the next state at a next time may be determined based on the current state at a current time, current value of first motion statistics, e.g. gait score, $F\_g$ in Eqn. (6), based on time-domain correlation/time-domain ACF) and current value of second motion statistics, e.g. $F\_p$ in Eqn. (4), based on frequency-domain correlation). $F\_s$ may be slope (or derivative) of second motion statistics (e.g. $F\_p$) in a time window.

In an initialization procedure, an initial state may be determined to be one of the four states (e.g. FAR-AWAY). A current state may be initialized as FAR-AWAY. In FSM, the state transition behaviors are as described in Clauses 21 to 25 below.

In some examples, the target may be near one of the Type1 device or the Type2 device. In some examples, the target may be one of the Type1 device or the Type2 device.

The following numbered clauses provide examples for wireless proximity detection.

Clause 1. A wireless sensing method/device/system/software, comprising: transmitting a wireless signal by a Type1 heterogeneous wireless device through a wireless multipath channel in a venue; receiving the wireless signal by a Type2 heterogeneous wireless device, wherein the received wireless signal differs from the transmitted wireless signal due to the wireless multipath channel and a movement of an object in the venue; obtaining a time series of channel information (TSCI) of the wireless multipath channel based on the received wireless signal; computing a first motion statistics based on a time-domain correlation of the CI of the TSCI; computing a second motion statistics based on a frequency-domain correlation of the CI of the TSCI; detecting a proximity of the object to a target in the venue based on the first motion statistics and the second motion statistics.

Clause 2. The wireless sensing method/device/system/software of clause 1, comprising: computing a third time trend of the proximity of the object to the target based on a first time trend of the first motion statistics and a second time trend of the second motion statistics.

Clause 3. The wireless sensing method/device/system/software of clause 1 or 2, comprising: computing the first motion statistics repeatedly at a first repetition rate, each first motion statistics based on a respective first sliding window of the TSCI; computing the second motion statistics repeatedly at a second repetition rate, each second motion statistics based on a respective second sliding window of the TSCI; computing the proximity repeatedly at a third repetition rate.

Clause 4. The wireless sensing method/device/system/software of clauses 1 to 3, comprising: computing a time-domain auto-correlation function (ACF) based on the CI in a first sliding time window of the TSCI, the time-domain ACF comprising a plurality of time-domain correlation; computing the first motion statistics based on the ACF.

Clause 5. The wireless sensing method/device/system/software of clause 4, comprising: computing a feature of each CI of the TSCI, wherein the feature comprises one of: a magnitude, a phase, a magnitude of a component of the CI, a phase of a component of the CI, a magnitude square, a function of the magnitude, computing the time-domain ACF based on the feature of each CI in the sliding time window of the TSCI.

Clause 6. The wireless sensing method/device/system/software of clause 4 or 5, comprising: computing at least one characteristic point of either the time-domain ACF or a function of the time-domain ACF; computing the first motion statistic based on the at least one characteristic point; wherein the at least one characteristic point comprises at least one of: a global maximum, a global minimum, a constrained maximum, a constrained minimum, a maximum restricted to a positive argument of the ACF or the function of the ACF, a maximum restricted to a negative argument of the ACF or the function of the ACF, a minimum restricted to a positive argument of the ACF or the function of the ACF, a minimum restricted to a negative argument of the ACF or the function of the ACF, a local maximum, a local minimum, a first local maximum, a first local minimum, a second local maximum, a second local minimum, a third local maximum, a third local minimum, an inflection point, a zero-crossing point, a first inflection point, a first zero-crossing point, a second inflection point, a second zero-crossing point, a third inflection point, or a third zero-crossing point; wherein the function of the time-domain ACF comprises at least one of: a linear function, a piecewise linear function, a nonlinear function, a polynomial function, an exponential function, a logarithmic function, a trigonometric function, a transcendental function, a derivative function, a first derivative, a second derivative, a third derivative, an integration function, a single integration, a double integration, a triple integration, an absolute function, a magnitude function, an indicator function, a thresholding function, a quantization function, a function obtained by filtering of the time-domain ACF the filtering comprising at least one of: a lowpass filtering, a bandpass filtering, a highpass filtering, a smoothing filtering, or a weighted averaging.

Clause 7. The wireless sensing method/device/system/software of clause 4 to 6, comprising: computing more than one characteristic points of the either time-domain ACF or function of the time-domain ACF; computing the first motion statistics based on another function of the more than one characteristic points.

Clause 8. The wireless sensing method/device/system/software of clause 4 to 7, comprising: computing a local maximum as a first characteristic point of the either time-domain ACF or function of the time-domain ACF; computing a local minimum as a second characteristic point of the either time-domain ACF or function of the time-domain ACF; computing a difference by subtracting the local minimum from the local maximum; computing the first motion statistics based on the difference.

Clause 9. The wireless sensing method/device/system/software of clause 8, comprising: wherein the local maximum is the first local maximum with argument being positive; wherein the local minimum is the first local minimum with argument being positive.

Clause 10. The wireless sensing method/device/system/software of clause 8 or 9, comprising: when at least one of the first characteristic point or the second characteristic point cannot be determined, the difference of the two characteristic points is computed as zero.

Clause 11. The wireless sensing method/device/system/software of clause 8 to 10, comprising: computing a spatial-temporal information (STI) based on a third characteristic point of the either time-domain ACF or function of the time-domain ACF, wherein the STI comprises one of: a location, a distance, a speed, an acceleration; computing a probability score based on the STI; computing the first motion statistics based on both the probability score and the difference of the first and second characteristic points.

Clause 12. The wireless sensing method/device/system/software of clause 11, comprising: computing the probability score based on a probability density function (pdf).

Clause 13. The wireless sensing method/device/system/software of clause 12, comprising: wherein the probability density function comprises a mixture of pdf, at least one pdf being generalized Gaussian.

Clause 14. The wireless sensing method/device/system/software of clause 11 to 13, comprising: wherein the first motion statistics in monotonic non-decreasing with respect to the probability score and also with respect to the difference of the two characteristic points.

Clause 15. The wireless sensing method/device/system/software of clause 1 to 14, comprising: computing the frequency-domain correlation based on the CI in a second sliding time window of the TSCI.

Clause 16. The wireless sensing method/device/system/software of clause 1 to 15, comprising: wherein each CI comprises a representation with a plurality of components, each component associated with a frequency index; computing a plurality of k-component correlation, each k-component correlation being a correlation between a respective component of a CI and a respective adjacent component of the CI, wherein the frequency indices of the two respective components of the CI differ by k, where k is an integer greater than zero; computing the frequency-domain correlation based on an aggregate of the plurality of k-component correlation, wherein any aggregate comprises at least one of: a sum, a weighted sum, a mean, an average, a weighted mean, a trimmed mean, a product, a weighted product, an arithmetic mean, a geometric mean, a harmonic mean, or another aggregate of any of the above.

Clause 17. The wireless sensing method/device/system/software of clause 16, comprising: computing a feature of each component of the CI, wherein the feature comprises one of: a magnitude, a phase, a magnitude square, or a function of the magnitude, computing each respective k-component correlation based on the feature of the respective component and the feature of the respective adjacent component.

Clause 18. The wireless sensing method/device/system/software of clause 16 or 17, comprising: computing a first plurality of the k-component correlation for a first value of k; computing at least one first aggregate of the first plurality of the k-component correlation for the first value of k; computing a second plurality of the k-component correlation for a second value of k, computing at least one second aggregate of the second plurality of the k-component correlation for the second value of k; computing the frequency-domain correlation based on a third aggregate of the at least one first aggregate and the at least one second aggregate.

Clause 19. The wireless sensing method/device/system/software of clause 1 to 18, comprising: determining at least four states of the proximity of the object to the target comprising: a FAR-AWAY state, indicating that the object is far away from the target, an APPROACHING state, indicating that the object is moving towards the target, a NEAR state, indicating that the object is near the target, and a LEAVING state, indicating that object is moving away from the target; determining an initial state to be one of the at least four states; determining a next state at a next time based on a current state at a current time, the first motion statistics and the second motion statistics.

Clause 20. The wireless sensing method/device/system/software of clause 19, comprising: determining the initial state to be the FAR-AWAY state.

Clause 21. The wireless sensing method/device/system/software of clause 19 or 20, comprising: when the current state at the current time is FAR-AWAY: transitioning from the FAR-AWAY state to the APPROACHING state if the first motion statistics (F_g) is greater than a first threshold and a slope of the second motion statistics (F_s) is greater than a second threshold; otherwise, remaining in the FAR-AWAY state.

Clause 22. The wireless sensing method/device/system/software of clause 19 to 21, comprising: when the current state at the current time is APPROACHING: transitioning from the APPROACHING state to the NEAR state if the second motion statistics (F_p) is greater than a third threshold; transitioning from the APPROACHING state to the LEAVING state if the first motion statistics is greater than a fourth threshold and a slope of the second motion statistics is less than a fifth threshold, wherein the fifth threshold is negative; remaining in the APPROACHING state if the first motion statistics is greater than a sixth threshold and the slope of the second motion statistics is greater than a seventh threshold; otherwise, transitioning from the APPROACHING state to the FAR-AWAY state.

Clause 23. The wireless sensing method/device/system/software of clause 19 to 22, comprising: when the current state at the current time is NEAR: transitioning from the NEAR state to the LEAVING state if the first motion statistics is greater than an eleventh threshold and the slope of the second motion statistics is less than a twelfth threshold, wherein the twelfth threshold is negative; otherwise, remaining in the NEAR state.

Clause 24. The wireless sensing method/device/system/software of clause 19 to 23, comprising: when the current state at the current time is LEAVING: transitioning from the LEAVING state to the FAR-AWAY state if the second motion statistics is less than a thirteenth threshold; transitioning from the LEAVING state to the APPROACHING state if the first motion statistics is greater than a fourteenth threshold and a slope of the second motion statistics is greater than a fifteenth threshold; otherwise, remaining in the LEAVING state.

Clause 25. The wireless sensing method/device/system/software of clause 1 to 24, comprising: wherein the target is near one of the Type1 device or the Type2 device.

Clause 26. The wireless sensing method/device/system/software of clause 1 to 25, comprising: wherein the target is either the Type1 device or the Type2 device such that the proximity of the object is relative to either the Type1 device or the Type2 device.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method for wireless sensing, comprising:
transmitting, by a first wireless device, a wireless signal through a wireless multipath channel in a venue;
receiving, by a second wireless device, the wireless signal through the wireless multipath channel, wherein the received wireless signal differs from the transmitted wireless signal due to the wireless multipath channel and a movement of an object in the venue;
obtaining a time series of channel information (TSCI) of the wireless multipath channel based on the received wireless signal;
computing a spatial-temporal information (STI) based on a time-domain auto-correlation function (ACF) of channel information (CI) in a first sliding time window of the TSCI computed based on a first feature of each CI;
computing a gait score based on the STI;
computing a time series of resampled CI (TSRCI) by resampling the TSCI;
computing a proximity score based on a frequency-domain k-component correlation of resampled CI (RCI) in a second sliding time window of the TSRCI computed based on a second feature of each RCI; and
detecting a proximity state of the object to a target in the venue based on the gait score and the proximity score in a third sliding time window.

2. The method of claim 1, further comprising:
computing, based on a first time trend of the gait score and a second time trend of the proximity score, a third time trend of the proximity state of the object to the target.

3. The method of claim 1, further comprising:
computing the gait score repeatedly at a first repetition rate, each gait score being computed based on a respective first sliding window of the TSCI;
computing the proximity score repeatedly at a second repetition rate, each proximity score being computed based on a respective second sliding window of the TSCI; and
computing the proximity state of the object to the target repeatedly at a third repetition rate.

4. The method of claim 1, wherein:
the time-domain ACF comprises a plurality of time-domain correlations.

5. The method of claim 4,
wherein the first feature comprises one of: a magnitude, a phase, a magnitude of a component of the CI, a phase of a component of the CI, a magnitude square, or a function of the magnitude.

6. The method of claim 4, further comprising:
computing at least one characteristic point of either the time-domain ACF or a function of the time-domain ACF; and
computing the STI based on the at least one characteristic point,
wherein the at least one characteristic point comprises at least one of:
a global maximum, a global minimum, a constrained maximum, a constrained minimum, a maximum restricted to a positive argument of the ACF or the function of the ACF, a maximum restricted to a negative argument of the ACF or the function of the ACF, a minimum restricted to a positive argument of the ACF or the function of the ACF, a minimum restricted to a negative argument of the ACF or the function of the ACF, a local maximum, a local minimum, a first local maximum, a first local minimum, a second local maximum, a second local minimum, a third local maximum, a third local minimum, an inflection point, a zero-crossing point, a mean-crossing point, a first inflection point, a first zero-crossing point, a first mean-crossing point, a second inflection point, a second zero-crossing point, a second mean-crossing point, a third inflection point, a third zero-crossing point, or a third mean-crossing point;
wherein the function of the time-domain ACF comprises at least one of:
a linear function, a piecewise linear function, a non-linear function, a polynomial function, an exponential function, a logarithmic function, a trigonometric function, a transcendental function, a derivative function, a first derivative, a second derivative, a third derivative, an integration function, a single integration, a double integration, a triple integration, an absolute function, a magnitude function, an indicator function, a thresholding function, a quantization function, or
a function obtained by filtering of the time-domain ACF, the filtering comprising at least one of: a lowpass filtering, a bandpass filtering, a highpass filtering, a smoothing filtering, or a weighted averaging.

7. The method of claim 1, further comprising:
computing multiple characteristic points of either the time-domain ACF or the function of the time-domain ACF; and
computing the gait score based on the STI and an additional function of the multiple characteristic points.

8. The method of claim 7, further comprising:
computing a local maximum as a first characteristic point of either the time-domain ACF or the function of the time-domain ACF;
computing a local minimum as a second characteristic point of either the time-domain ACF or the function of the time-domain ACF;
computing a difference of the first and second characteristic points by subtracting the local minimum from the local maximum; and
computing the gait score based on the STI and the difference.

9. The method of claim 8, wherein:
the local maximum is the first local maximum with argument being positive; and
the local minimum is the first local minimum with argument being positive.

10. The method of claim 8, wherein:
when at least one of the first characteristic point or the second characteristic point cannot be determined, the difference of the first and second characteristic points is computed as zero.

11. The method of claim 6, further comprising:
computing the spatial-temporal information (STI) based on a third characteristic point of either the time-domain ACF or the function of the time-domain ACF, wherein the STI comprises one of: a location, a distance, a speed, or an acceleration;
computing a STI probability score based on the STI; and
computing the gait score based on the STI probability score.

12. The method of claim 11, further comprising:
computing the STI probability score based on a STI probability density function (pdf).

13. The method of claim 12, wherein:
the STI pdf comprises a mixture of pdf's, wherein at least one of the pdf's is a generalized Gaussian pdf obtained in a training phase.

14. The method of claim 11, wherein:
the gait score is a monotonic non-decreasing function of the STI probability score and the difference of the first and second characteristic points.

15. The method of claim 1, wherein the second feature comprises one of: a magnitude, a phase, a magnitude of a component of the RCI, a phase of a component of the RCI, a magnitude square, or a function of the magnitude.

16. The method of claim 1, further comprising:
computing a plurality of frequency-domain k-component correlations, wherein:
   each CI comprises a representation with a plurality of frequency-domain components,
   each of the plurality of frequency-domain components is associated with a respective frequency index,
   each of the plurality of k-component correlations is a correlation between a respective frequency-domain component of a CI and a respective adjacent frequency-domain component of the CI,
   the frequency indices of the respective component and the respective adjacent component of the CI differ by k,
   k is an integer greater than zero; and
computing the frequency-domain k-component correlation based on an aggregate of the plurality of k-component correlations, wherein the aggregate comprises at least one of: a sum, a weighted sum, a mean, an average, a weighted mean, a trimmed mean, a product, a weighted product, an arithmetic mean, a geometric mean, a harmonic mean, or another aggregate of any of the above.

17. The method of claim 16, further comprising:
for each respective frequency-domain k-component correlation with respect to a respective CI:
   computing the second feature of each frequency-domain component of the respective CI; and
   computing the respective frequency-domain k-component correlation based on the second feature of the respective frequency-domain component and the second feature of the respective adjacent frequency-domain component.

18. The method of claim 16, further comprising:
computing a first plurality of frequency-domain k1-component correlations, wherein k1 is a first integer greater than zero;
computing at least one first aggregate of the first plurality of frequency-domain k1-component correlations;
computing a second plurality of frequency-domain k2-component correlations, wherein k2 is a second integer greater than zero;
computing at least one second aggregate of the second plurality of frequency-domain k2-component correlations; and
computing the frequency-domain k-component correlation based on a third aggregate of the at least one first aggregate and the at least one second aggregate.

19. The method of claim 1, further comprising:
determining at least four proximity states of the object to the target, wherein the at least four proximity states comprises:
   a FAR-AWAY state, indicating that the object is far away from the target,
   an APPROACHING state, indicating that the object is moving towards the target,
   a NEAR state, indicating that the object is near the target, and
   a LEAVING state, indicating that object is moving away from the target;
determining an initial proximity state to be one of the at least four proximity states; and
determining a next proximity state at a next time based on:
   a current proximity state at a current time, the gait score, and the proximity score.

20. The method of claim 19, further comprising:
determining the initial proximity state to be the FAR-AWAY state.

21. The method of claim 19, further comprising:
when the current proximity state at the current time is the FAR-AWAY state:
   transitioning from the FAR-AWAY state to the APPROACHING state in response to a determination that a condition is met, wherein the condition comprises: (a) the gait score is greater than a first threshold and (b) a slope of the proximity score is greater than a second threshold; and
   remaining in the FAR-AWAY state in response to a determination that the condition is not met.

22. The method of claim 19, further comprising:
when the current proximity state at the current time is the APPROACHING state:
   transitioning from the APPROACHING state to the NEAR state in response to a determination that a first condition is met, wherein the first condition comprises the proximity score is greater than a third threshold;
   transitioning from the APPROACHING state to the LEAVING state in response to a determination that a second condition is met, wherein the second condition comprises: (a) the gait score is greater than a fourth threshold and (b) a slope of the proximity score is less than a fifth threshold, wherein the fifth threshold is a negative number;
   remaining in the APPROACHING state in response to a determination that a third condition is met, wherein the third condition comprises: (c) the gait score is greater than a sixth threshold and (d) the slope of the proximity score is greater than a seventh threshold; and
   transitioning from the APPROACHING state to the FAR-AWAY state in response to a determination that none of the first, second and third conditions is met.

23. The method of claim 19, further comprising:
when the current proximity state at the current time is the NEAR state:
   transitioning from the NEAR state to the LEAVING state in response to a determination that a condition is met, wherein the condition comprises: (a) the gait score is greater than an eighth threshold and (b) a slope of the proximity score is less than a ninth threshold, wherein the ninth threshold is a negative number; and
   remaining in the NEAR state in response to a determination that the condition is not met.

24. The method of claim 19, further comprising:
when the current proximity state at the current time is the LEAVING state:
   transitioning from the LEAVING state to the FAR-AWAY state in response to a determination that a first condition is met, wherein the first condition comprises: the proximity score is less than a tenth threshold;

transitioning from the LEAVING state to the APPROACHING state in response to a determination that a second condition is met, wherein the second condition comprises: (a) the gait score is greater than an eleventh threshold and (b) a slope of the proximity score is greater than a twelfth threshold; and remaining in the LEAVING state in response to a determination that none of the first and second conditions is met.

25. The method of claim 1, wherein:
the target is near one of the first wireless device or the second wireless device.

26. The method of claim 1, wherein:
the target is either the first wireless device or the second wireless device, such that the proximity of the object is relative to either the first wireless device or the second wireless device.

27. A system for wireless sensing, comprising:
a first wireless device configured to transmit a wireless signal through a wireless multipath channel in a venue;
a second wireless device configured to receive the wireless signal through the wireless multipath channel, wherein the received wireless signal differs from the transmitted wireless signal due to the wireless multipath channel and a movement of an object in the venue; and
a processor configured for:
obtaining a time series of channel information (TSCI) of the wireless multipath channel based on the received wireless signal,
computing a spatial-temporal information (STI) based on a time-domain auto-correlation function (ACF) of channel information (CI) in a first sliding time window of the TSCI computed based on a first feature of each CI,
computing a gait score based on the STI,
computing a time series of resampled CI (TSRCI) by resampling the TSCI,
computing a proximity score based on a frequency-domain k-component correlation of resampled CI (RCI) in a second sliding time window of the TSRCI computed based on a second feature of each RCI, and
detecting a proximity state of the object to a target in the venue based on the gait score and the proximity score in a third sliding time window.

28. The system of claim 27, wherein the processor is further configured for:
computing the gait score repeatedly at a first repetition rate, each gait score being computed based on a respective first sliding window of the TSCI;
computing the proximity score repeatedly at a second repetition rate, each proximity score being computed based on a respective second sliding window of the TSCI; and
computing the proximity state of the object to the target repeatedly at a third repetition rate.

29. The system of claim 27,
wherein the first feature comprises one of: a magnitude, a phase, a magnitude of a component of the CI, a phase of a component of the CI, a magnitude square, or a function of the magnitude.

30. An apparatus for wireless sensing, comprising:
a receiver configured to receive a wireless signal transmitted by a transmitter through a wireless multipath channel in a venue, wherein the received wireless signal differs from the transmitted wireless signal due to the wireless multipath channel and a movement of an object in the venue;
a memory having a set of instructions stored therein; and
a processor communicatively coupled to the memory and configured for:
obtaining a time series of channel information (TSCI) of the wireless multipath channel based on the received wireless signal,
computing a spatial-temporal information (STI) based on a time-domain auto-correlation function (ACF) of channel information (CI) in a first sliding time window of the TSCI computed based on a first feature of each CI,
computing a gait score based on the STI,
computing a time series of resampled CI (TSRCI) by resampling the TSCI,
computing a proximity score based on a frequency-domain k-component correlation of resampled CI (RCI) in a second sliding time window of the TSRCI computed based on a second feature of each RCI, and
detecting a proximity state of the object to a target in the venue based on the gait score and the proximity score in a third sliding time window.

* * * * *